Figure 1:
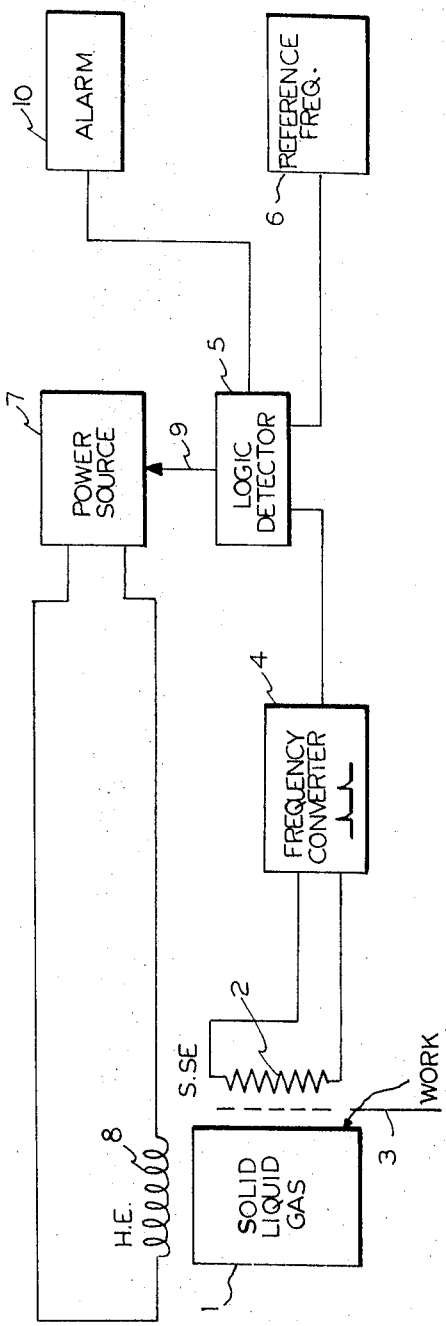

United States Patent

[11] 3,586,830

| [72] | Inventors | Frank W. Leitner;<br>Bobby B. Childress, both of Charlotte, N.C. |
|---|---|---|
| [21] | Appl. No. | 779,778 |
| [22] | Filed | Nov. 29, 1968 |
| [45] | Patented | June 22, 1971 |
| [73] | Assignee | Coltron Industries, Inc.<br>Charlotte, N.C. |

[54] LOGICAL CONTROL FOR DISCRETELY METERING ENERGY TO THERMAL SYSTEMS INCORPORATING APPARATUS AND METHODS FOR SIMULATING TIME RELATED TEMPERATURES
27 Claims, 36 Drawing Figs.

| [52] | U.S. Cl. | 219/501, 219/497 |
|---|---|---|
| [51] | Int. Cl. | H05b 1/02 |
| [50] | Field of Search | 219/499, 501, 505, 497; 328/134, 110; 307/232, 234; 340/146.2 |

[56] References Cited
UNITED STATES PATENTS

| 2,846,147 | 8/1958 | Keating | 236/32 |
| 3,012,126 | 12/1961 | Ferguson | 219/501 X |
| 3,069,623 | 12/1962 | Murgio | 328/134 X |
| 3,300,622 | 1/1967 | Swain | 219/501 X |
| 3,365,654 | 1/1968 | Johnson | 219/501 X |

*Primary Examiner*—Bernard A. Gilheany
*Assistant Examiner*—F. E. Bell
*Attorney*—Wilfred G. Caldwell ABSTRACT: The present invention relates to logically controlled unique temperature systems, and it more particularly relates to methods and apparatus for establishing and controlling thermal systems wherein sensing means may anticipate temperature conditions at other points, such as at the work or loads and wherein the controlled heating means are related to the thermal capacity of the system. This arrangement is particularly compatible with unique logical control wherein the temperature signal(s) is converted to a digital pulse train for logical analysis, in turn capable of controlling the heating means by discrete energy bursts. Also, the computer or logical means are capable of sounding an alarm in the event of abnormal conditions or conditions deviating from predetermined patterns.

INVENTORS
FRANK W. LEITNER
BOBBY B. CHILDRESS

BY *Wilfred G. Caldwell*
ATTORNEY

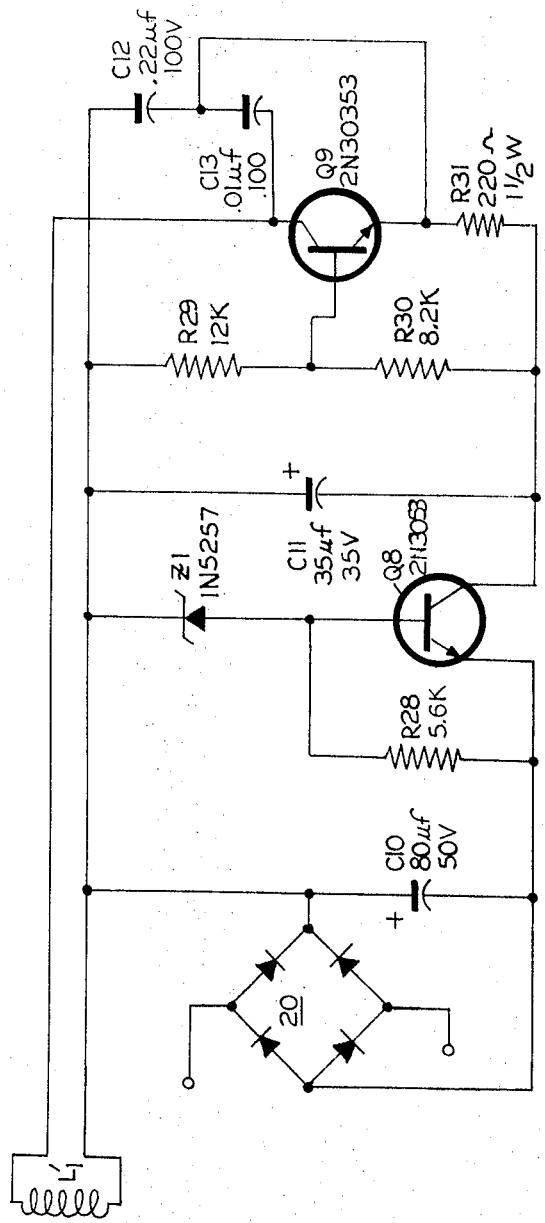
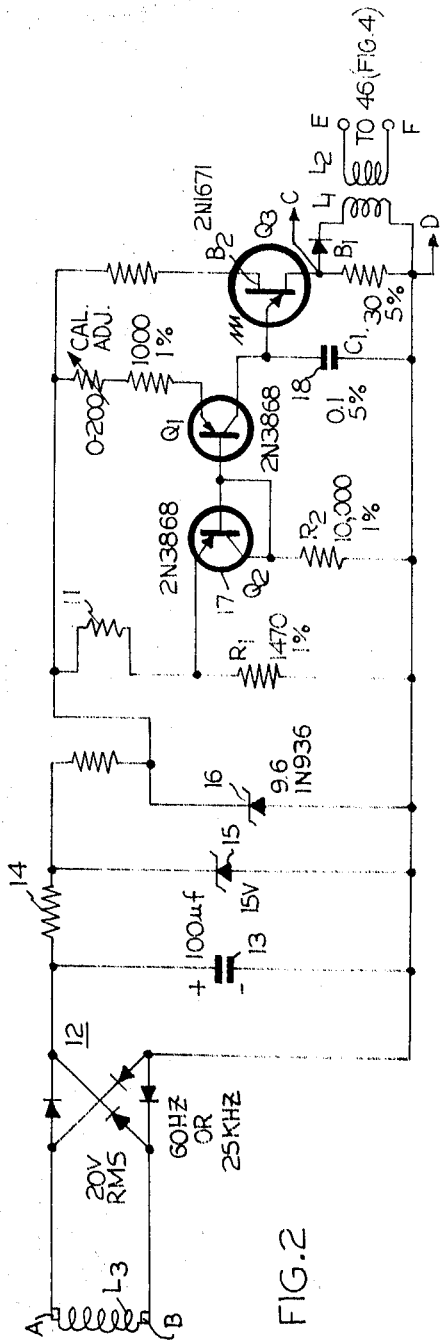

INVENTORS
FRANK W. LEITNER
BOBBY B. CHILDRESS

BY Wilfred J. Caldwell
ATTORNEY

INVENTORS
FRANK W. LEITNER
BOBBY B. CHILDRESS

BY Wilfred G. Caldwell
ATTORNEY

CLOCK PULSE FLIP-FLOP

COUNTER DIVIDER
DUAL FLIP-FLOP

INVENTORS
FRANK W. LEITNER
BOBBY B. CHILDRESS

BY *Wilfred G. Caldwell*
ATTORNEY

| | THERM. COND. BTU/SQ.FT. OF IN. | SPECIFIC HEAT BTU/LB °F | SPECIFIC GRAVITY | SPECIFIC HEAT X SPECIFIC GRAVITY |
|---|---|---|---|---|
| ALUMINUM | 1540 | .23 | 2.71 | .623 |
| STEEL | 360 | .107 | 7.86 | .840 |
| BRASS | 830 | .09 | 8.47 | .760 |
FIG. 21
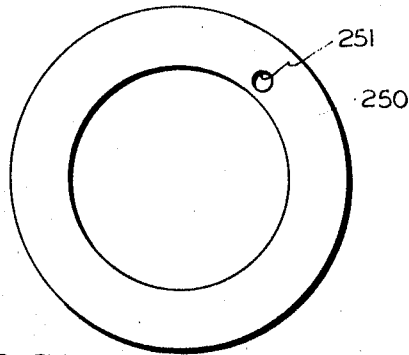
FIG. 22
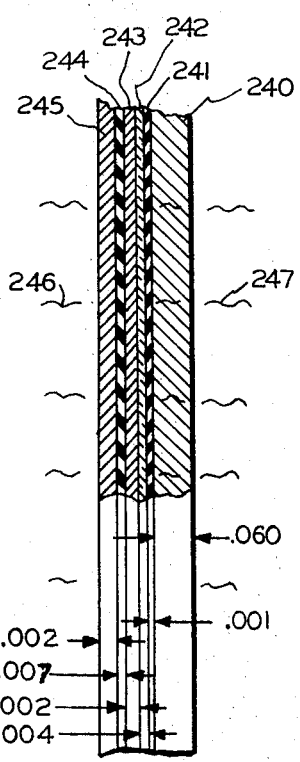
FIG. 20
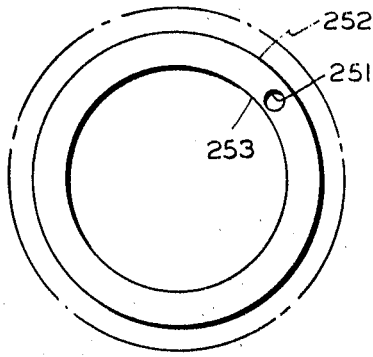
FIG. 23
INVENTORS
FRANK W. LEITNER
BOBBY B. CHILDRESS
BY Wilfred G. Caldwell
ATTORNEY

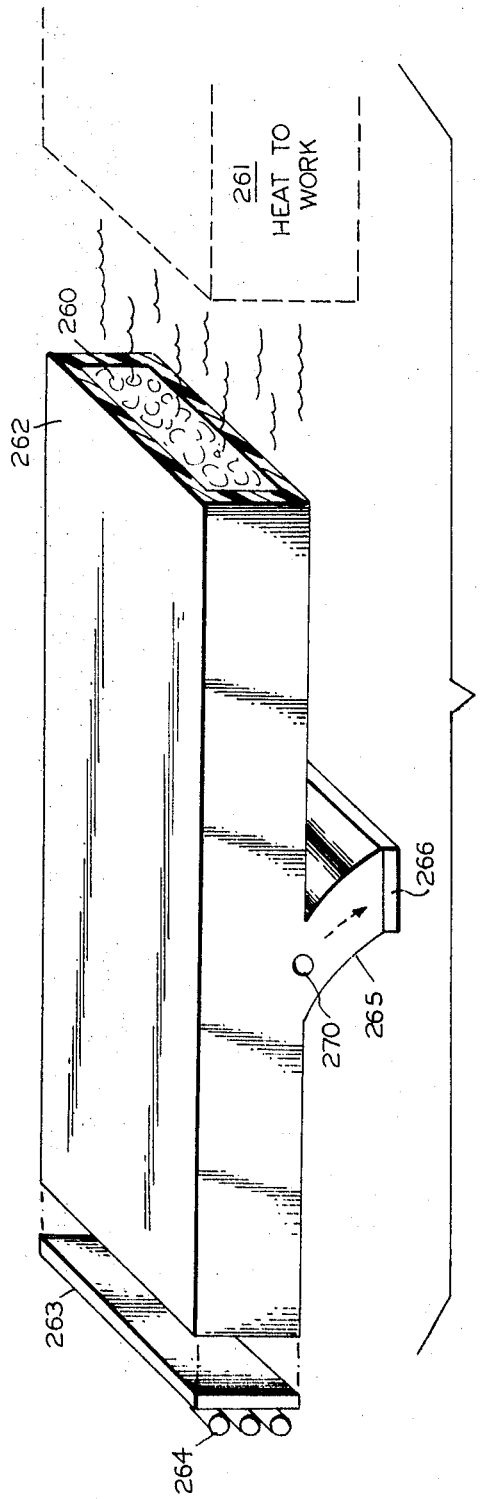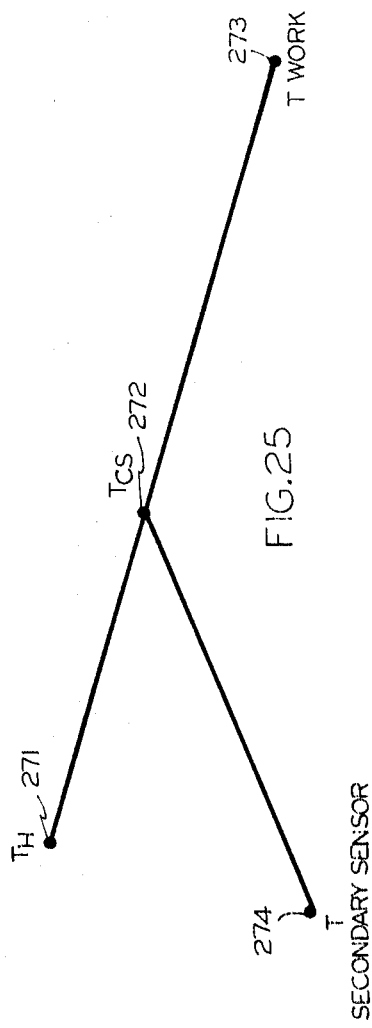

INVENTORS
FRANK W. LEITNER
BOBBY B. CHILDRESS

BY Wilfred G. Caldwell
ATTORNEY

LOGICAL CONTROL FOR DISCRETELY METERING ENERGY TO THERMAL SYSTEMS INCORPORATING APPARATUS AND METHODS FOR SIMULATING TIME RELATED TEMPERATURES

The principles of this invention teach that exact metering of predetermined bursts of energy may provide exact control of thermal inertia or momentum, given a certain amount of information for logical referencing. It has also been determined that substantially precise momentum control may be obtained if sampling is effected at a sufficiently high rate and known or predetermined quantities of heat are applied, when required, but in metered amounts, each insufficient to produce undesired overshoot or departure from a reference temperature (set point). It is understood that the energy bursts may be applied in continuing discrete fashion or trains or any percentage thereof including, for example, 99.6 percent (i.e., odd percentages of full available power input) or down to a percentage equal to that of one predetermined burst (per any unit of time), as called for by the logic.

In other words, the logic sampling electronic control enables the present thermal arrangement to be employed with extreme accuracy in an on/off type control which is compatible with conventional digital computers. Such a computer may be used in different manners, as for example, it may provide the logical determinations for controlling the discrete bursts of energy input or it may simply comprise parallel connected monitoring and alarm circuitry disposed at the work area or located remotely thereof; or it may serve in both capacities. Thus, it may now be appreciated that such a local or remote monitoring or control station may be used for hundreds or thousands of thermal systems by employing conventional high speed scanning techniques.

The present thermal system enables anticipation by virtue of the use or establishment of a secondary or thermal path different from the primary thermal path of heat flow from the heat source to the load. The secondary path or paths have at least one point in common with the primary path from which thermal parameters such as rate of heat flow and temperature gradient are known or may be determined, relative to the same factors for the primary path.

Therefore, in such a closed loop system, various arrangements have been developed for providing matching, anticipating, or lagging conditions along the secondary or simulated path for location for sensing means to relate conditions corresponding to those at the load, which may or may not be inaccessible. Initially, let it be assumed that the thermal time constants are equal from the heating source to the load and from the heating source to the sensing means, then for anticipation, it is only necessary to add heat to the sensing means, such as by a spiral heater wire or current of warm air, in order to permit it to anticipate the temperature momentum at the load, to control the energy input to the heating means, thereby avoiding overshoot. This may be considered for conditions for load or no load. For example, the preheating of the sensing means may be terminated when set temperature is reached; or the preheating may be relieved when the load is applied, thus calling for more temperature from the heating source in the latter case. Thus, various combinations of the principles herein taught may be made to produce the various embodiments hereinafter described in detail.

Basically, it will now be appreciated that the anticipatory function heretofore associated with electronic controls is now built into the thermal system such that standard computers can be used to monitor and/or control these systems with the only requirements being that the computer examine the digital inputs thereto against stored or known references or patterns to detect faults or deviations.

The analog temperature signal is converted to a discrete digital frequency pulse train as close to its source as possible, and this frequency pulse train is compared with a standard or reference frequency to switch a solid state triac or other type triggering control on and off to control the application of power bursts to the heating means. This high resolution frequency comparison circuit can be made to operate in various binary configurations. However, the simplest provides a single AND circuit, wherein if two consecutive pulses from the pulse train do not occur within the negative half-cycle of the reference frequency (which has been divided by 4), then the output from the AND gate triggers a one-shot multivibrator to cause the triac to conduct for the predetermined minimum energy burst. Sampling or pulse comparison is effected at a high rate compared to the time for one minimum energy burst, which in itself is only a tiny amount of energy supplied to the heater, but such tiny amounts can be supplied repeatedly to increase the temperature of the heater substantially. However, exact heat control is maintained because of the relatively high rate analog-to-frequency pulse train representing the sensor temperature compared to the time period for a single energy burst.

With the foregoing in mind, the invention will be better appreciated when examined in the light of various type control systems; such as, on the one hand, the on/off type control, and on the other hand, the proportional type control each with its own particular set of advantages, now for the first time realizable in the unique approach herein set forth.

Looking first at the conventional on/off system, it will be appreciated that it is basically a high resolution arrangement relative to load changes, but it can oscillate about this high resolution set point if the thermal capacity of the heating source is high relative to the thermal inertia and momentum of the system as heretofore existed.

Normally, the proportional type control is utilized to obscure the incompatibility between the control and the thermal system. However, under a given set of conditions, this system may accurately maintain set point temperature but in the event of load changes, ambient temperature changes, supply voltage changes, or other such disturbances, they operate to change the set point.

The present invention presents the ultimate in high resolution of on/off type controllers without overshoot because of the anticipatory built-in arrangement and without oscillation about set point temperature by virtue of the unique minimal energy burst technique.

While it will be understood that the thermal system herein disclosed is useful with other type electrical controls, and that the electronic logical control is useful with other type energy systems including thermal systems, nevertheless, the combination thereof permits anticipation and metering which in turn enables application of the invention to situations heretofore inaccessible, and also to conventional situations with attendant unusual advantages. For example, the invention may be applied to heated godets for handling synthetic yarns. In so doing, not only is a much more reliable and inexpensive control obtained, but it should be pointed out that the walls of the godet may be made of much less material, i.e., thinner material, less expensive material with reduced mass and mechanical inertia, with considerably less power required and with versatility of group monitoring and control at minimal expense with optimum reliability.

It may be further appreciated that with the precise digital logic control incorporated in this arrangement, adjustments are unnecessary and the conditions encountered are go or no-go, i.e., normal or fault, and of course the speed of operation is far beyond the capacity of man.

With the foregoing in mind, various objects of the invention are as follows:

The provision of apparatus and methods enabling accurate temperature control for even remote or inaccessible sources or loads.

The provision of apparatus and a method employing analog to digital conversion in close proximity to the sensor or source of original analog temperature data to develop precise, reliable, and repeatable signals unaffected by noise or length of transmission path, to remote control, monitor, alarm, or other devices, when conventional digital system noise immunity techniques are used.

The provision of such a system and method capable of full advantage of the early analog to digital conversion where attenuation losses and wave shape disturbances cannot alter the intelligence because it is a frequency train compatible to telemetering, remote, and computer handling techniques.

The provision of such arrangements for extremely high-speed comparison of load temperature to set point temperature with attendant control beyond human supervision and thus beyond human adjustments under normal working conditions.

The provision of such a system and method incorporating logic alarm networks capable of comprehending patterns depicting the energy demands of the thermal system because of the compatibility of logic and discrete energy burst input power.

The provision of such methods and apparatus wherein the pattern monitored may comprise more than a single parameter compared against more than a single reference; and, many groups thereof to determine a single or plural faults or deviations form the normal.

The provision of such arrangements using a single reference for any number of thermal systems regardless of the location from the reference and regardless of the parameters of the thermal system, i.e., temperature control of a stationary cylindrical body, rotating cylindrical body, vessel rectangular or otherwise, liquid, solid, or gas work control. In other words, the logic control need not be aware of what it is controlling.

The provision of such an arrangement wherein conversion from analog to digital signals enables high-level signals permitting the use of ultrahigh-speed scanners and logic controls without detrimental contact resistance and other disadvantages attendant with low-level signal scanning.

The provision of such apparatus and methods enabling relatively low-cost logic-type control with absolute accuracy compared to conventional proportional controls with reset features which are relatively incompatible with digital computers.

The provision of such an arrangement wherein logic is incorporated of the type achieving nonadjustable control, i.e., go or no-go, unlike conventional systems requiring adjustment to varying parameters.

The provision of such a system capable of measuring thermal parameters at a rate much faster than the periods of discrete thermal energy bursts, i.e., a unique type of sampling.

The provision of such a system and method for enabling parallel operations of computer techniques from remote sources for analysis and/or control purposes.

The provision of such a system which eliminates any requirement for analog instrumentation which, as is known, is relatively slow and inaccurate.

The provision of such a thermal system providing built-in anticipatory functions for rapid-energy level change without overshoot, particularly during warmup when the energy level is being accelerated from ambient to set level temperature.

The provision of a system and method enabling thermal control so that the simulated sensor temperature may be selected nearly equal to, equal to, or greater than the work temperature which may also be time related through predetermined or measured parameters enabling the sensor to reach the set point equivalent temperature at any time relative to the load temperature reaching set point.

Figure 10:
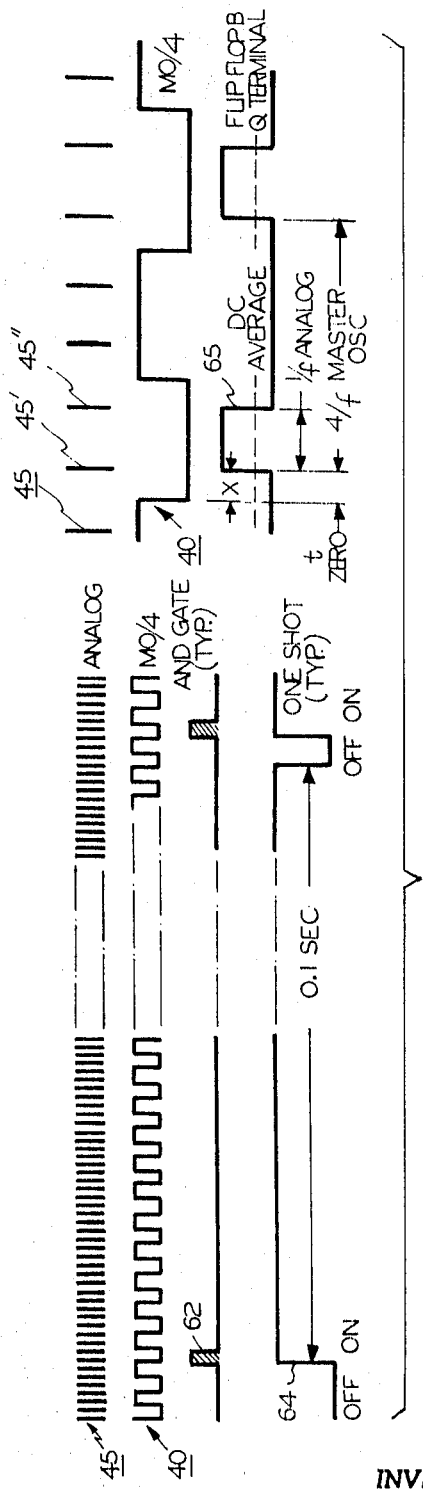
Figure 3:
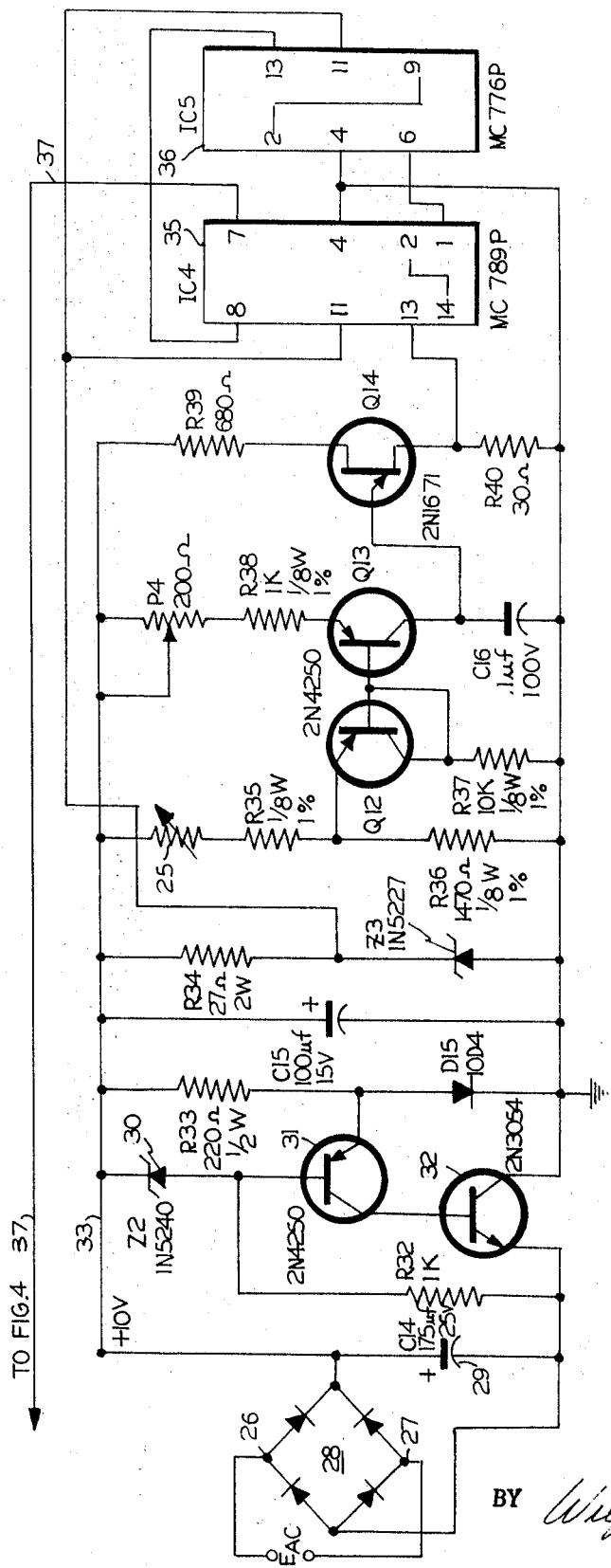
Figure 4:
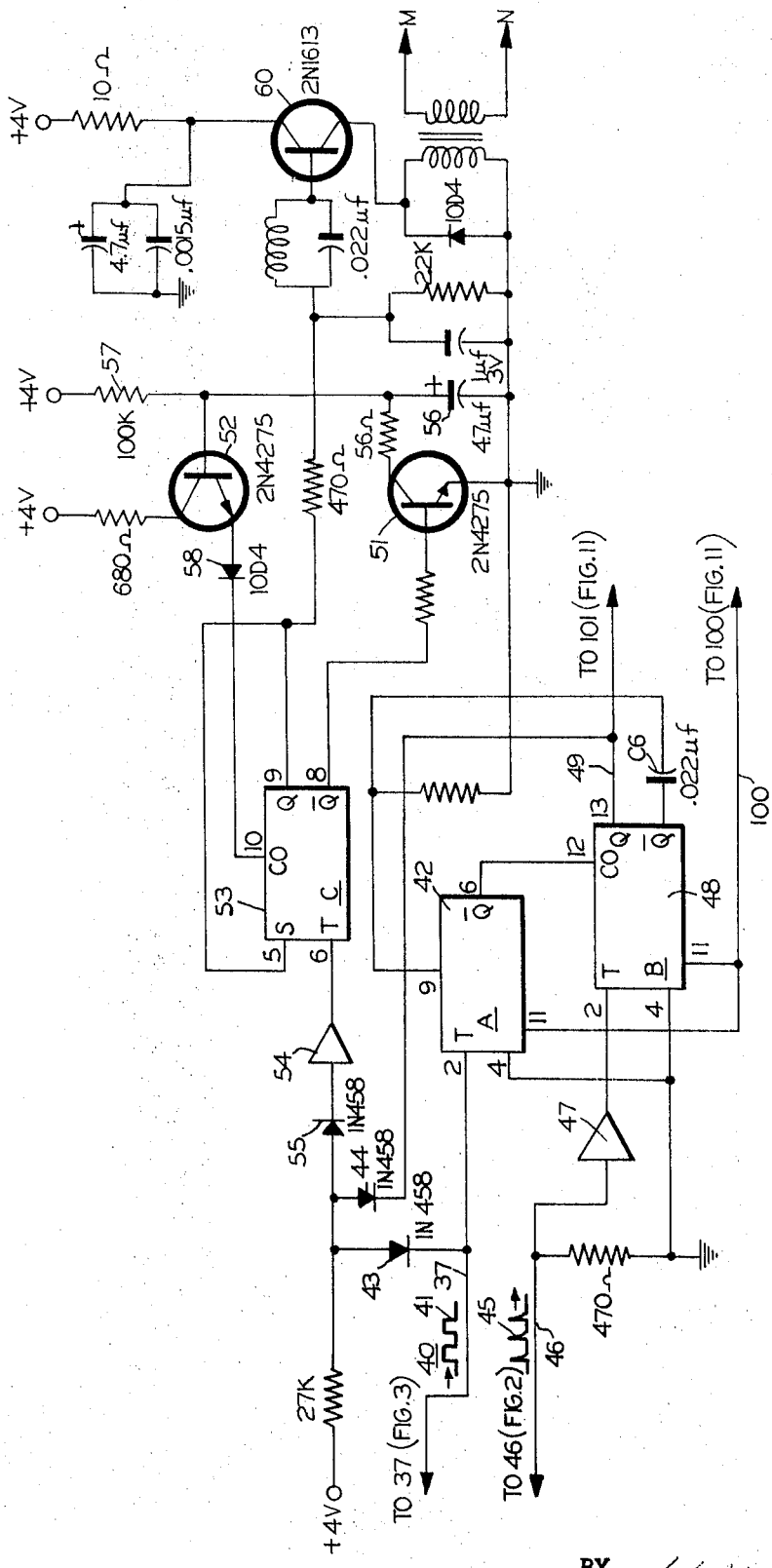
Figure 5:
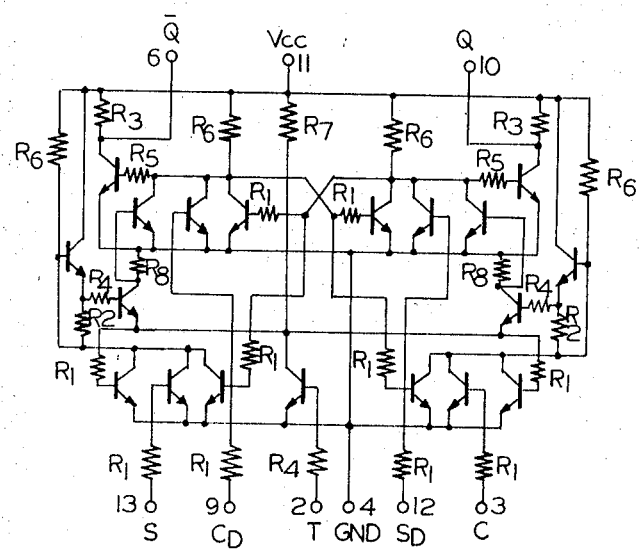
Figure 6:
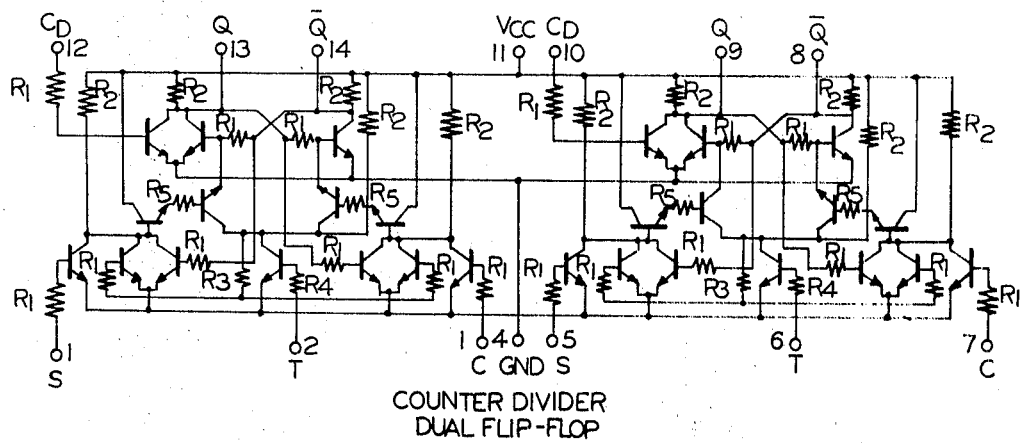
Figure 7:
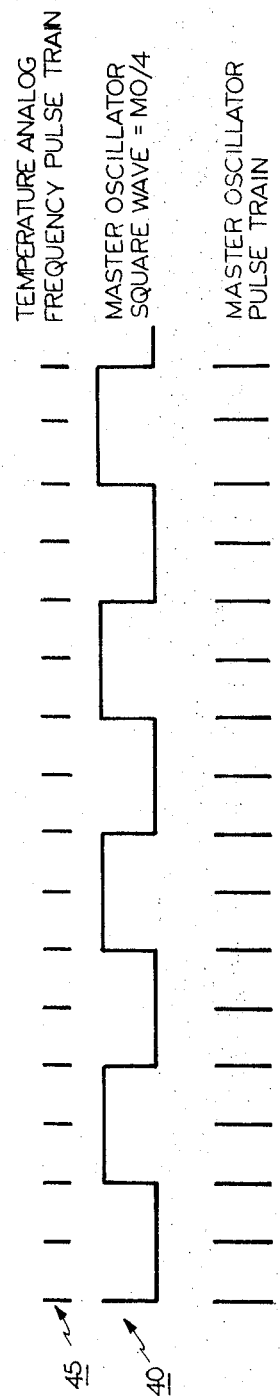
Figure 8:
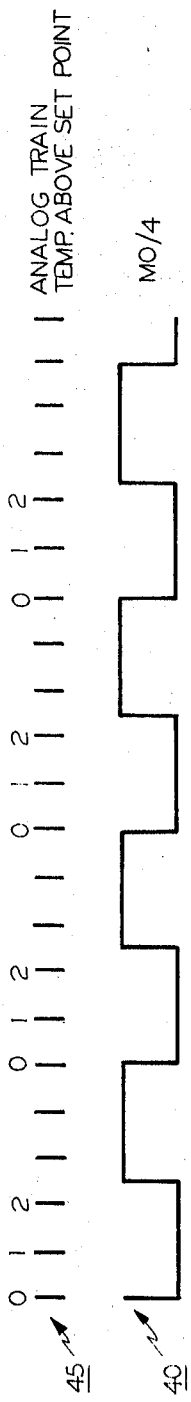
Figure 9:
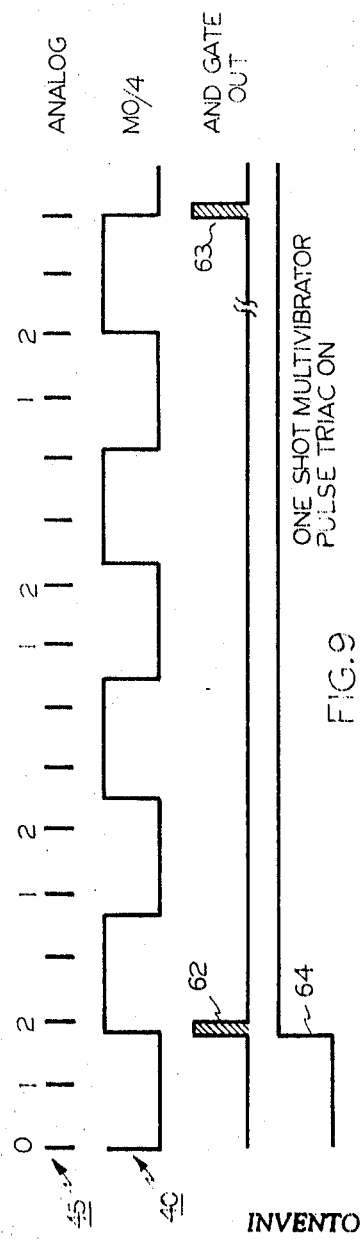
Figure 11:
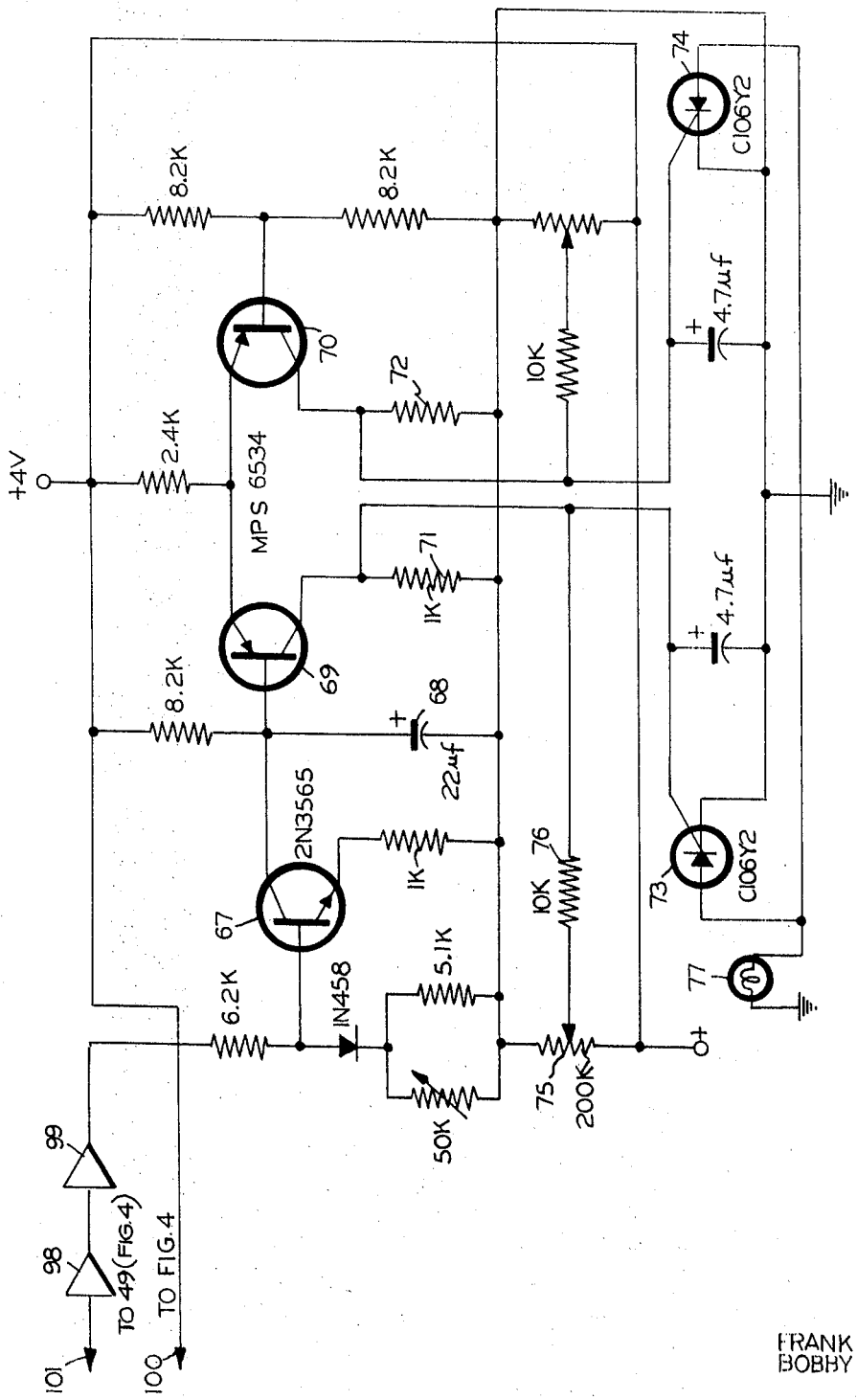
Figure 12:
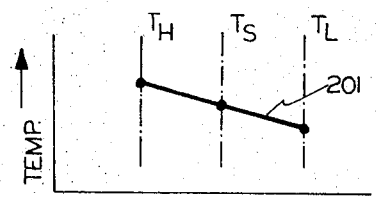
Figure 13:
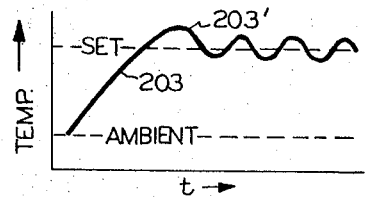
Figure 14:
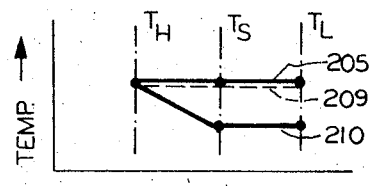
Figure 15:
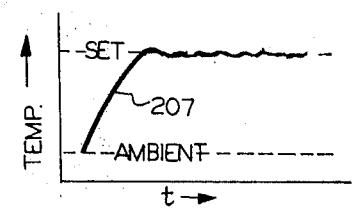
Figure 17:
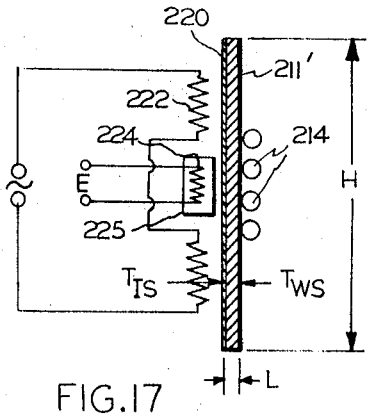
Figure 18:
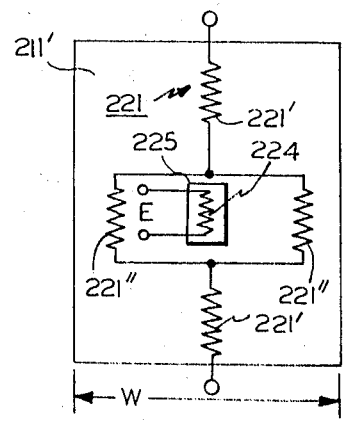
Figure 19:
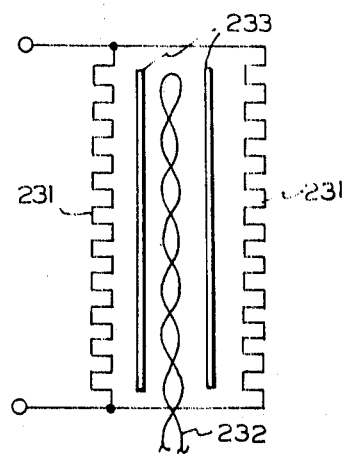
Figure 27:
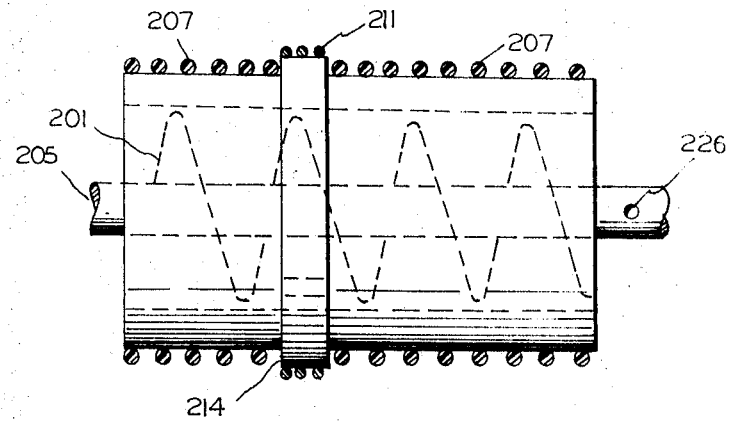
Figure 26:
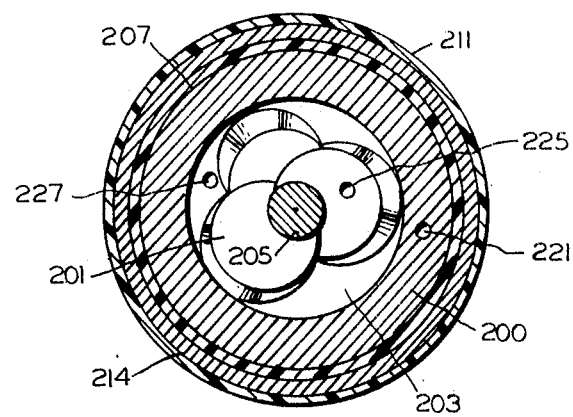
Figure 28:
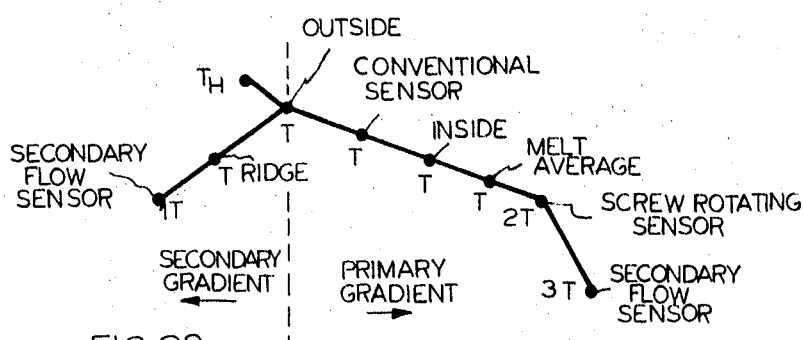
Figure 29:
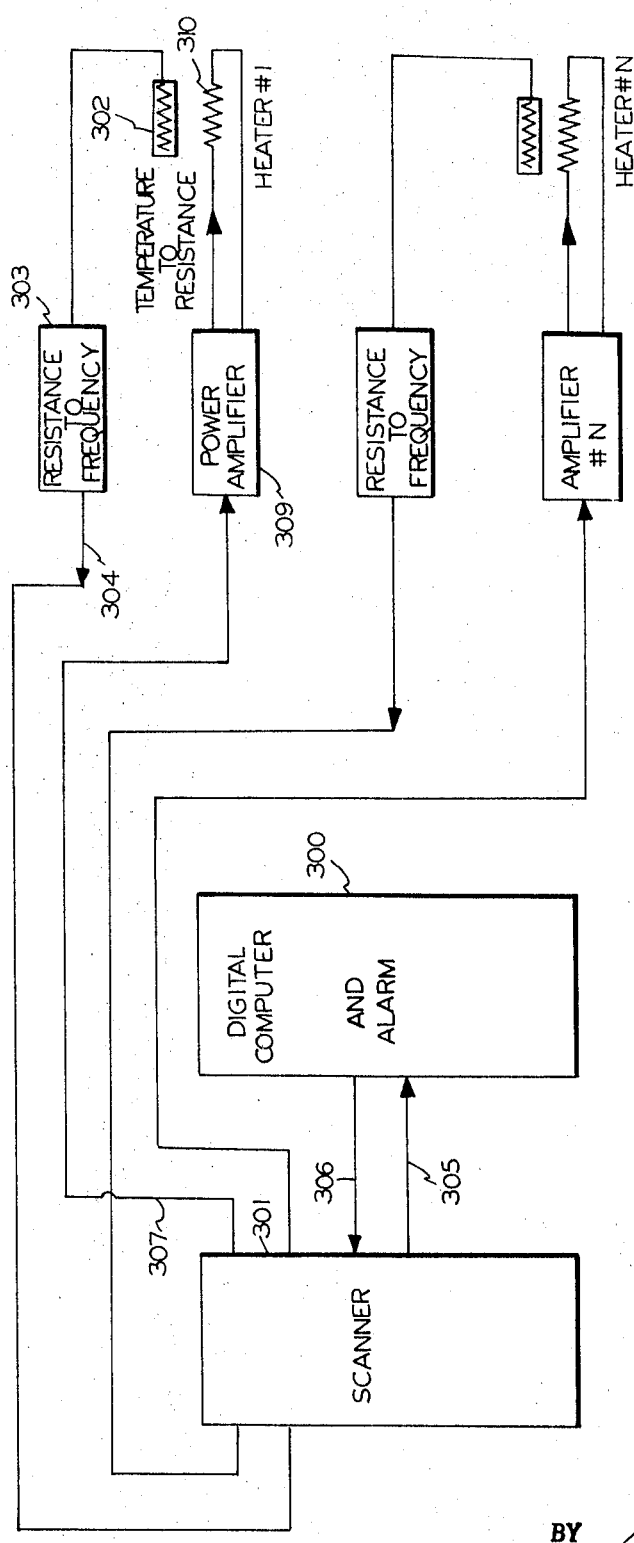
Figure 31:
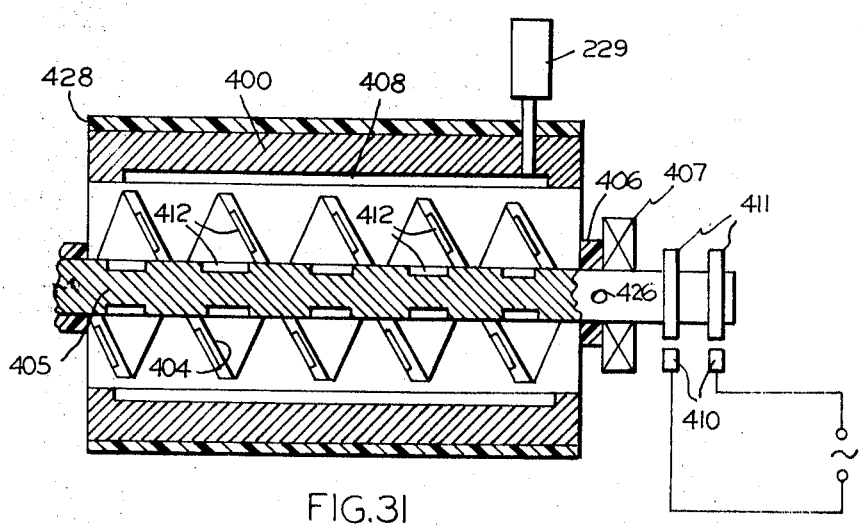
Figure 30:
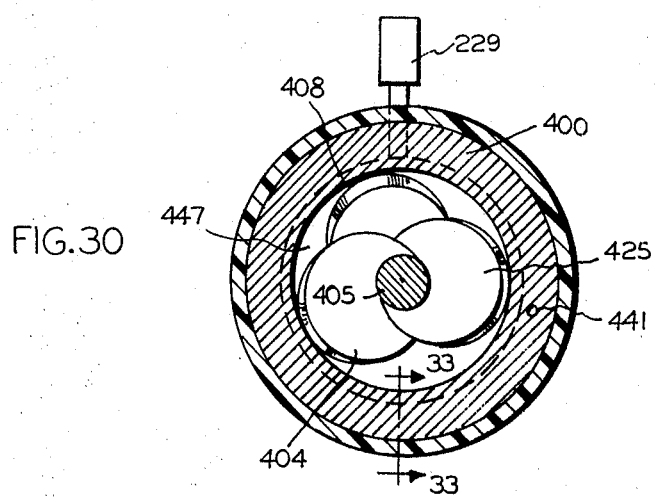
Figure 32:
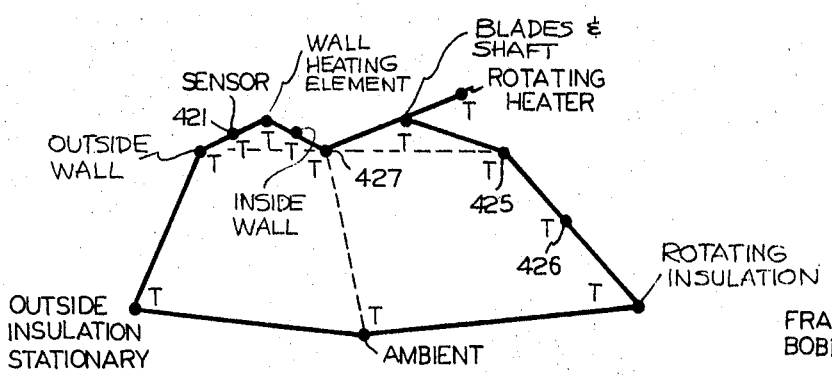
Figure 33:
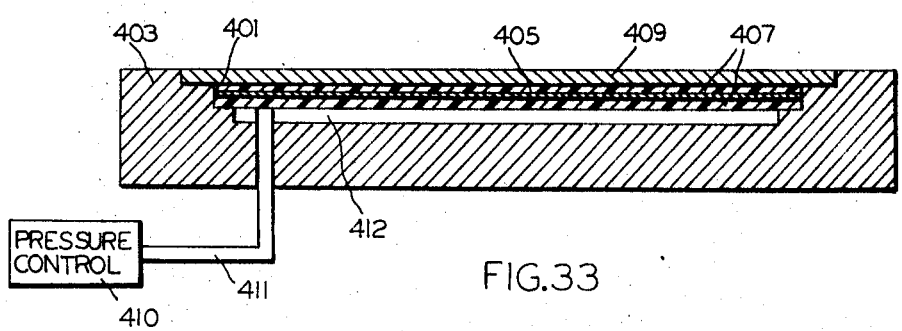

With the foregoing in mind, the invention will be better understood from a reading of the following detailed description thereof when taken in the light of the accompanying drawings wherein:

FIG. 1 is a block DIAGRAM broadly to illustrate the type control provided by this system and method, FIG. 2 is an electrical oscillator circuit for converting temperature signals (resistance variation) to pulse frequency trains, i.e., analog to digital converter, FIG. 2A shows a suitable power source for the stationary or rotating converter of FIG. 2, FIG. 3 shows a suitable master or reference oscillator for producing a fixed frequency for use in the logic system, FIG. 4 is provided to illustrate the basic logic circuitry, FIG. 5 shows in detail the circuitry of one of the 3 identical integrated chips of FIG. 4, FIG. 6 shows detail of the circuitry of dual of the integrated chips of FIG. 4, two are in the same flat pack, FIG. 7 is a chart showing the temperature analog frequency pulse train compared to the master oscillator pulse train and master oscillator frequency divided by 4 square wave, FIG. 8 is a similar chart to illustrate the condition wherein the sensed temperature is above the set point temperature, FIG. 9 charts the pulses and wave forms to show the triggering of energy bursts for power input to the heating means, FIG. 10 is an overall pulse diagram showing operation throughout the control circuitry in general and the logic circuitry in particular, FIG. 11 shows a suitable alarm type circuit for use in this system, FIG. 12 is a temperature gradient chart of conventional nature, FIG. 13 is a conventional temperature-time chart showing warmup overshoot, FIG. 14 illustrates one manner in which the present invention modifies the conventional temperature gradient chart, FIG. 15 shows a temperature-time chart for the present invention evidencing lack of overshoot, FIG. 6 illustrates a conventional type heater-sensor arrangement, FIG. 17 is a view of one heater-sensor embodiment of the present invention, FIG. 18 is a different view of a portion of FIG. 17, FIG. 19 shows an alternative arrangement for the sensor-heater of the present invention, FIG. 20 shows a dimensioned thermal system patterned after the systems of FIGS. 17 and 18, and wherein predetermined quantities of electrical insulation may be selected to serve as the control for the heat leak path, FIG. 21 is a chart of various thermal coefficients for different materials, FIG. 22 illustrates a conventional point sensing arrangement for a cylinder or godet, FIG. 23 suggests the elimination of mass from such an arrangement, FIG. 24 is a perspective view of the invention incorporating intentional heat leak, FIG. 25 is a temperature chart for selected temperatures obtaining in the structure of FIG. 24, FIG. 26 shows one embodiment of the invention applied to an extruder, FIG. 27 is a view in side elevation of the structure of FIG. 26, FIG. 28 is a temperature chart for the structure of FIGS. 26 and 27, FIG. 29 is a schematic representation of an automatic thermal system control useful for multiple installations, FIG. 30 is an end view of an extruder to illustrate internal heat application and control provided by another embodiment of the invention, FIG. 31 is a view in side section of the structure of FIG. 30, FIG. 32 is a temperature chart for the structure of FIGS. 30 and 31, and FIG. 33 depicts a different embodiment of a heater-sensor thermal arrangement particularly suited for internal or external surface heating along a flat, curved, or cylindrical surface.

Figure 34:
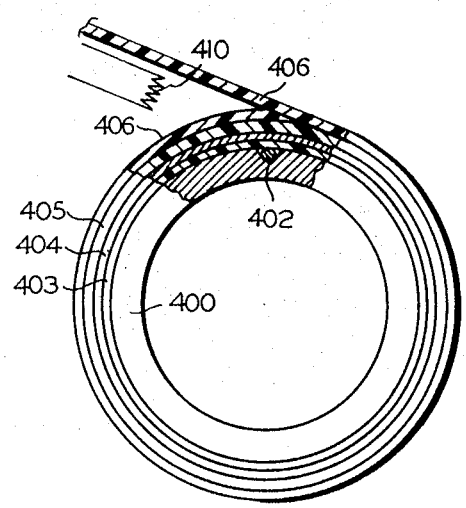
Figure 35:
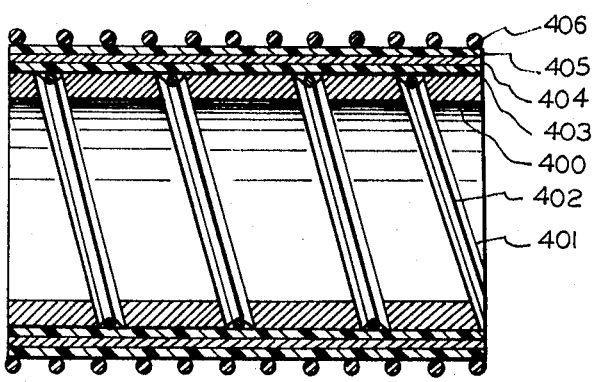

FIG. 34 is a view partly in end elevation, broken away to show the section of apparatus incorporating a thermal system particularly applicable to heated godets or the like for the textile field, and FIG. 35 shows the structure of FIG. 34 in cross section.

Referring now to the drawings, and particularly to FIG. 1, it will be seen that the present logical thermal control system is applied to a load or work piece 1, which may comprise solid, liquid, or gaseous material. The sensing element 2 is shown in proximity to or remotely of work 1, but spaced therefrom along a heat leak or heat dissipating path having a thermal loss control 3.

Sensor 2 may comprise, in its simplest form, a resistance wire, such as nickel, platinum, or the like in which the resistance changes in proportion to the temperature. This analog temperature resistance change or signal is applied to frequency converter 4 to produce a discrete digital output in the form of a pulse frequency train. The frequency converter may be stationary or rotating, but it is preferably in close proximity to sensor 2 in order that the purest signal possible is converted without an opportunity for the introduction of noise or other disturbances.

The digital signal is now applied as a frequency pulse train to logic detector 5 which also receives a master or reference frequency from source 6. Depending upon which frequency is highest, energy is either applied or not applied from power source 7 to heater 8 because the logic output over lead 9 serves to trigger the power source 7 for at least one predetermined burst of energy when required. At this point it should be appreciated that comparison of the two input frequencies to logic detector 5 is taking place many times during the interval of the minimum predetermined energy burst, such that if further power is required, the logic detector will be instantly ready to trigger in a second, third, or fourth burst of energy until the frequencies are changed so that no further energy is required at that time. However, the logic detector continues to make hundreds or even thousands of comparisons a second, thereby achieving the steady set point temperature without the many disadvantages of the undulating surface temperatures that would be established by a conventional on-off control without such high resolution and without the described metered bursts of power. That is, the logic commits only an incremental, i.e., small or tiny burst of energy and may stop at one burst. This small burst of energy may be so small as to be hardly recognized in the resultant temperature increase that occurs at the work as a result thereof.

Referring to FIG. 1 again, an analog alarm circuit is shown at 10. This alarm circuit is further described in detail in connection with FIG. 11

Obviously, a computer may replace the logic detector 5 and master oscillator 6, as well as alarm 10. Alternatively, it may be connected in parallel with one or all of these components to serve for standby use in the event of malfunction.

FIG. 2 depicts circuitry which is used to convert the sensing resistance 11 to a digital pulse train (block 2 of FIG. 1). The power for the oscillator of FIG. 2 is introduced through winding L3 secondary if the oscillator is stationary or rotating, or alternatively through slip rings A and B if the oscillator is rotating. When supplied via L3 rotating 20 kHz. air coil is used. The pulse train output is derived at points C and D if the oscillator is stationary and at points E and F if the oscillator is rotating. The analog to digital oscillator-type converter develops the precise pulse frequency output train in which the repetition rate is controlled by the temperature caused resistance variation of resistor 11 which serves as sensor 2 in FIG. 1.

In FIG. 2 the full wave rectifier bridge 12 is supplied with 24 volts AC which is rectified and filtered by capacitor 13 and resistor 14, with zener diodes 15 and 16 serving to stabilize the DC input to the oscillator portion next to be described.

Generally, the resistance change of sensor bulb 11 causes the voltage at Q2 emitter 17 to shift negative in proportion to the resistance change. Q1 is a constant current type generator and this constant current charges C1, shown as capacitor 18, at a constant rate. Therefore, the time varying voltage at capacitor 18 or the Q3 emitter is quite linear with times.

Q2 is preferably a transistor of the same type Q1 and its temperature sensitive base to emitter voltage varies at the same rate as Q1. These transistors track within $30\mu$ per degree Centigrade. The ratio of R1 and R2 is chosen to obtain nearly equal emitter currents at the center of the ambient temperature range, and C1 is a temperature stable poly carbonate film capacitor with negligible drift to 65°C.

Q3 is a unijunction transistor and is extremely stable as a level sensing device to produce a high level output pulse when the emitter voltage exceeds this constant level. C1 is discharged via a negative resistance emitter to its lower base path to precise valley voltage where the emitter base junction reverts to a reverse biased diode. C1 recharges linearly to the precise peak point voltage and the cycle repeats with the result being the pulse train output at Q3 base whose frequency is a precise analog of the bulb resistance and hence the bulb or godet temperature. The air core coaxial coils L1 and L2, used for rotating oscillators, have a 1-to-2-turns ratio of number 32 wire with L2 preferably having 50 turns and being the stationary coil.

The L2 output pulse train may be utilized, for example, to trigger a monostable multivibrator to produce a constant amplitude constant width rectangular output pulse for each trigger. The result is a DC output voltage which may appear on a conventional indicator or recorder and may be calibrated to read in Centigrade or Fahrenheit degrees.

The nonlinearity of the nickel bulb tends to compensate for the nonlinearity of circuit, resulting in the linear output. Nickel is nonlinear from about 0° to 380° C. If a platinum bulb is substituted, it must be compensated for electrical nonlinearity, and if a thermistor were to replace the sensing resistor, the sense of the circuit will be reversed and while the sensitivity is increased, the calibration would be less linear.

A silicon diode added between Q3B1 and L1 provides 0.4 to 0.6 volts isolation between stray pick up to L1 and the potential at Q3B1. This minimizes pickup volts which might incorrectly modulate the C1 voltage and cause erroneous frequency modulation.

In FIG. 2A there is shown a suitable power supply for the oscillator of FIG. 2. Fullwave bridge 20 is supplied with input AC power which is rectified and stabilized by Q8 and Q9 to be delivered at winding or coil $L'_2$ for coupling into $L'_2$ of FIG. 2.

If $L'_1$ is a stationary coil, it can induce power into coil $L'_2$ when the latter rotates. Otherwise the tow coils may comprise stationary transformer windings. Alternatively, the output of the power supply of FIG. 2A may be delivered directly to slip rings A and B of FIG. 2 in the absence of coils $L'_1$ and $L'_2$ while still accommodating a rotating oscillator.

In FIG. 3 there is illustrated the master or reference oscillator capable of providing a standard or fixed frequency in the form of a square wave output of one-quarter the frequency of the master oscillator for use in the logical control network. This is a resistance controlled oscillator electrically matched to the oscillator of FIG. 2. However, the calibrated variable resistor 25 (which serves as the group adjustable potentiometer for multiple control) is substituted for the sensing resistor 11 of FIG. 2 to fix the frequency of the reference oscillator. Since this oscillator will always be stationary and usually will serve for multiple thermal systems, as at the computer or in the control room, the input power may be applied as an AC voltage at terminals 26 and 27 of fullwave rectifier bridge 28. Large filtering capacitor 29 is provided for the output from bridge 28. Zener diode 30 and transistors 31 and 32 are provided to regulate and stabilize the voltage for this reference oscillator with B+ being established at 10 volts on lead 33. Otherwise the oscillating portion of the oscillator of FIG. 3 is identical to the equivalent portion heretofore described in connection with FIG. 2.

The output pulse frequency train from the master oscillator of FIG. 3 is inverted in integrated chip 35 which is a hex inverter, manufactured by Motorola and identified as type MC789P. The negative output pulses from chip 35 drive or serve as the clock input to a conventional digital logic J.K. flip-flop, shown as the integrated chip 36, available as Motorola type MC776P (see FIG. 6). The flip-flop toggles each clock pulse, providing a perfectly symmetrical square wave output at one-half the pulse frequency. A second flip-flop in chip 36 is cascaded with the first flip-flop to produce a divided by 4 square wave. This wave drives an inverting transistor in chip 35 which in turn supplies the master oscillator reference buss 37 with the square reference frequency introduced to the logic circuit of FIG. 4 at lead 37.

The circuitry of the present invention is conveniently deployed on various cards or plug-in plates, facilitating ready assembly, servicing, or replacement. Thus, the master oscillator of FIG. 3 is connected into the logic of FIG. 4, as is also the temperature sensitive oscillator of FIG. 2.

In the control card of FIG. 4, the reference square wave 40 on lead 37 has negative leading edges such as 41 adapted to clock a preset J.K. flip-flop in chip 42 (shown in detail in FIG. 5) and also to supply one input to diode 43 which, together with diode 44, comprises an AND gate.

The A flip-flop in its preset condition has a $\bar{Q}$ output of +or in digital nomenclature, 1. This 1 is connected to the preset terminal of a second flip-flop B (chip 48 of FIG. 6 using one-half of the circuitry thereof) and forces it to remain preset so long as $\bar{Q}$ of A is 1. Under these conditions B will not respond to other inputs.

As the master oscillator square wave at $A_2$ swings to 0 from of A swings to O. This enables B to count negative going pulses.

The temperature analog pulse train 45 on lead 46 is inverted in inverter 47 and appears as a negative pulse train at $B_2$.

On the first negative pulse into $B_2$, Q of B swings to 1. On the second negative pulse, Q swings to O. $\bar{Q}$ of B is capacitively coupled to the preset terminal (9') of flip-flop A via $C_6$. Therefore, at the second pulse into $B_2$, $\bar{Q}$ swings to 1 and differentiated positive pulse forces A to preset. (Due to capacitive coupling, A is not held in preset). As A is preset, however, it forces B to preset until the next negative going excursion of the master square wave. The sequence than repeats as follows:

Master oscillator wave form 40 goes to 0, sets A, unlatches B. B counts and at 2, B pulses. A to preset latching B—repeat sequence at next master oscillator negative pulse, etc.

Remembering that the master oscillator wave form drives one input to the AND gate while Q of B is the second input over leads 49 and 50 (to diode 44) and to obtain a plus output, both inputs must be 1 (+) simultaneously, then it follows that if the count of two by flip-flop B occurs within the negative half-wave of the master oscillator, no output from the AND gate can occur. However, if the count of 2 takes place after the master oscillator pulse swings plus (1), then a positive output will occur at the AND gate output.

The resulting output pulse varies in pulse width and repetition as a function of the phase and frequency difference between these two nonsynchronous frequencies. The output disappears abruptly as the input pulse train frequency becomes less than the master oscillator pulse train (or less than 4 times the master oscillator square wave frequency).

The result is a high resolution frequency comparison circuit.

The varying pulse width output is detected by allowing it to trigger a one shot multivibrator made up of transistors 51 and 52 and the flip-flop C chip 53 (which is the other one-half of FIG. 6. The plus output pulse from the AND circuit is inverted in inverter 54 (diode 55 serving to hold the voltage to a safe level) and toggles the J.K. flip-flop C.

Once tripped, it cannot be clocked by virtue of its connection from terminal 9 to 5 until C is preset via the timing circuit. The timing circuit is made up of a 4.7 microfarad capacitor 56 and a 1000,000 ohm resistor 57 plus transistor switch emitter-follower 52 and diode 58.

Terminal 8 of C chip 53 swings negative when C is toggled. This releases the capacitor 56 to be charged via the 100,000 ohm resistor 57. At a capacitor voltage high enough to equal the drop of the emitter-follower junction plus the series silicon diode plus preset voltage required at C10, the flip-flop presets. The purpose of the diode 58 is to require about 0.6 volts higher trip voltage to lengthen the duration.

For each plus output of the AND gate (diodes 43, 44), positive pulse of about 0.1 second duration appears at terminal 9 of chip 53. This plus pulse biases the blocking oscillator, comprising transistor 60 and associated conventional components, on for a 0.1 second burst of about 2,000 Hertz trigger pulses for a conventional triac (not shown) but having connections M-N thereto. The triac is gated on and applies full 60 Hertz power to the heater (e.g. 8 of FIG. 1) for 0.1 second each time the AND gate shows coincidence.

When the godet (sensed temperature) frequency is low, the 0.1 second pulses appear end to end, practically speaking. The time between pulses is in the order of 0.001 second. As the set point is approached, the beat slows down so that pulses may occur with long intervals between.

Each pulse applies a tiny burst of power 0.1 second duration to the heater. The loop is self-adjusting to regulate the godet temperature holding the measured frequencies close to the master oscillator. When the transducer frequency (godet temperature analog) is equal to or greater than the master oscillator frequency, the power is shut off.

The foregoing will now further be explained using the wave form charts of FIGS. 7 through 10 to illustrate a few of the infinite combinations of wave trains that occur in the A, B, and C flip-flops of FIG. 4. FIG. 7 shows precise synchronization of frequency and phase between pulse train 45 and square wave 40, which by nature will occur only for microseconds or less. FIG. 8 shows complete power cutoff at over temperature (frequency of 45 is high relative to 40) since the counter of chip 48 (FIG. 4) will always reset before the plus master oscillator divided by 4 pulse arrives.

FIG. 9 shows a typical instant at a time when the temperature and frequency of 45 is low relative to 40, thereby providing AND gate (from diodes 43, 44, of FIG. 4) output pulses 62, 63 with pulse 62 triggering the one shot multivibrator 51, 52 and C to operative condition at 64.

FIG. 10 shows a typical instant in time relation between the wave forms and the one shot multivibrator. NOTE the OFF time becomes very great and random as set temperature is approached, and at temperature it shuts off completely, when the analog frequency exceeds the master oscillator.

The off temperature alarm circuit of FIG. 11 takes advantage of the fact that the Q terminal 49 (FIG. 4) of flip-flop B has a rectangular pulse 65 (FIG. 10) whose on to off time ratio is a function only of the relative frequencies.

Q of B flip-flop is at zero in the preset condition and B is forced to preset by flip-flop A until the negative edge of the master oscillator square wave 40 toggles A causing its $\bar{Q}$ to go to O. Call this time $T_{zero}$ (FIG. 10).

The first analog pulse 45' following $T_{zero}$ will toggle B causing Q to flip to 1. The second analog pulse 45'' following $T_{zero}$ will toggle B letting Q fall to zero.

Simultaneously $\bar{Q}$ of B goes to 1 and by its AC coupling to flip-flop A preset terminal, flip-flop A is preset. Flip-flop B has already been toggled to the condition it naturally is forced to by A (no action takes place between A and B until the next master oscillator square wave toggles A, etc.)

Also, in FIG. 10 the time shown as X varies with phase between the two pulse trains. It varies from 0° to 360° where it drops to zero or vice versa. However, the waveform at Q of B stands alone and its duty cycle is precisely a function of the frequency ratios.

Consequently, the average DC is extracted by using this wave form to drive a current generator transistor 67 (FIG 11) to a fixed current level each pulse, by way of inverters 98 and 99 in lead 101.

The constant current pulse at the collector is integrated by a 22 microfarad capacitor 68. This DC is applied to a fixed bias differential amplifier comprising transistors 69 and 70 which is biased for equal current in each collector at 0.25 duty cycle (temperature on set point).

Under these conditions equal voltages of about 330 millivolts, due to the collector to the collector currents, flow in the 1K resistors 71 and 72. These resistors are connected to the gates of small silicon controlled rectifiers (SCR) 73 and 74 which "fire" at 0.5 to 0.6 volts.

A second current from 200,000 ohm potentiometer 75 and a 10,000 ohm series resistor 76 is summed with the collector current. When the two currents cause a voltage drop equal to the SCR firing potential, it fires and latches on to light a series alarm lamp, such as 77 which can be remotely located and such a lamp can be provided for each thermal system or two such lamps could be provided for low or high alarm.

As the duty cycle shifts from 0.25 at the base of transistor 67 due to the frequencies being different, the collector currents of transistors 69 and 70 rise and fall in opposition, and at a frequency sufficiently off temperature, the (appropriate) lamp will light showing the temperature has shifted out of tolerance.

Since the set point is a function of frequency ratio, as other temperatures are programmed by the master control, this alarm set point is inherently—and automatically—adjusted. That is, it is independent of the absolute frequencies and returns to balance when the ratios are proper.

In the thermal arrangements explained in connection with FIGS. 17 and the FIGS. thereafter, consider first a conventional pin or drum heater adapted to be heated to a controlled temperature for drawing or otherwise handling synthetic yarn. Basically, the designer may select from three heating arrangements, the first employing induction heating; the second, flame or other nonelectrical heating; and the third heating wire disposed within the cylinder.

The object herein is to maximize the sensor heater efficiencies and provide new advantages by taking advantage of as many parameters as possible, such as materials, dimensions, physical deployment, and, in addition simulated arrangements particularly provided for use where the heating surface or work is inaccessible, although this technique may be employed under all circumstances to advantage.

Conventional temperature sensing may be achieved externally using the pyrometer or a thermistor of other sensing unit embedded in the wall of the cylinder. First of all, the temperature gradient obtaining in such an apparatus would show the temperature of the heater higher than the temperature of the sensor, because of the thermal drop from heater, part way through the wall to the sensor, and then, of course, the temperature of the load at the lowest temperature of all because the load or external surface of the drum is more remote from the heater source (see FIG. 12).

The load line or gradient is illustrated at 201. The usual difference in temperature between $T_H$ (heater) and $T_L$ (load) is large, so it is not only an inefficient arrangement, but also indicates that a good deal of thermal inertia might be encountered in such a system and, inherently it would be subject to slow response, high mass, and an overshoot type arrangement, which when employed with on-off type heat, would also show a substantial unstable set temperature, as may be seen in FIG. 12. Note that the temperature-time curve 203 is relatively slow rising, evidencing the temperature momentum due to the mass. It also substantially overshoots the set temperature as shown at 203'. Additionally, the ripple factor occasioned by the undulations about the set temperature is relatively high.

In FIG. 14, there is shown an idealized gradient wherein the slope of the load line 205 is near zero.

In FIG. 15, there is shown a somewhat idealized temperature-time curve 207 wherein no overshoot is present and the ripple factor is an absolute minimum for an on-off type control. Additionally, the rise time of curve 207 to set point temperature is much less and overshoot has been completely eliminated. The sensor-heater arrangement herein described produces the gradient and response curves approximating FIGS. 14 and 15. In actual practice, gradient 209 in FIG. 14 is obtainable, whereas the response curve 207 of FIG. 15 is an obtainable companion curve therefore. Moreover, the invention provides unusual control over the gradient, as for example, the gradient 210 of FIG. 14 may be produced or various other unique gradients.

Figure 16:
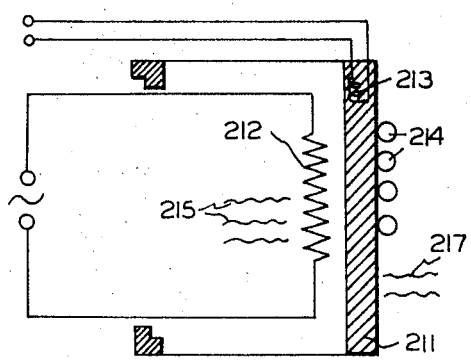

In FIG. 16 there is shown conventional type approach to a heater-sensor arrangement wherein the drum or cylinder section 211 is shown with an internal heater 212, a sensor 213, and a load in the form of synthetic strands 214. It can be seen that heat is lost by internal radiation 215 and external radiation 217. Obviously, the metal 211 accounts for a large thermal drop and additionally, it may be noted that the point sensor 213 ordinarily embedded in metal 211 via an edge hole or aperture is not symmetrical thermally with the load or heater; and, of course, is at a substantially different temperature than either.

With the conventional heater and control in mind, the principles obtaining in the novel arrangements hereinafter depicted will first be discussed followed by a description of the structure preferred in the embodiments to appear hereinafter. Therefore, looking at FIGS. 17 and 18, it will be seen that the basic thermal conductivity equation:

$$T_{is} - _{ws} = T_2 = [Q/A]L/K$$

may be applied to the heated body 211', which has dimensions of a thickness corresponding to $L$, a width corresponding to W and a height corresponding to H. The temperatures are $T_{is}$ which is the temperature of the inside surface with $T_{ws}$ being the temperature of the working surface. The total energy dissipated over the working surface having an area of W times H is identified as $Q$. The, for a given heat flow per unit of area, the temperature gradient delta $T_2$ is equal to $T_{is}$, minus $T_{ws}$. The basic equation covering the relationship herein described, as above set forth, is delta $T_2$ equals $Q$ over $A$ (times $L$ over $K$) where $K$ is the thermal conductively of the solid, the other parameters or quantities having previously been defined.

Looking at this equation, it appears obvious that for a given material ($K$), the temperature gradient is directly proportional to the thickness ($L$), and it is desired in the embodiment hereinafter set forth to decrease the gradient and, therefore, the thickness or $L$ dimension is made as small as feasible, for example, 40 to 50 percent of the thickness of the conventional body such as 211 in FIG. 16.

The other quantities of this equation will be analyzed in detail to provide guidelines for the design of the new embodiments, but in the meantime, the object is to produce a structure capable of creating a temperature approximating $T_{ws}$, without access to this temperature or surface, through simulation by intentionally establishing and using a heat leak which dissipates a small percentage of total energy or heat in the primary load or work path in the form of a second gradient with known parameters and conditions for normal operation to permit sampling or control through computer logic, based on this simulated gradient.

Interestingly enough, now that there is recognized a primary and secondary path, these may be interrelated by selecting a common temperature point, such as the temperature of the inside surface of the body to be heated, and build therefrom in different directions, the primary gradient to the load and the intentional heat leak gradient or secondary gradient, through the simulated path to obtain the necessary information without access to the load itself or surfaces attendant thereto. Thus, heat flow can be controlled before and after the sensor—in this case, a space sensor.

Next, the dimension of time as a parameter will be brought into the study to indicate that the materials selected may control this parameter and hence, influence the gradient in an unusual or different way.

Looking to the table of FIG. 21, it will be appreciated that the various characteristics for three metals, aluminum, steel, and brass are compared as to their thermal qualities. Considering first aluminum, there will be noted that its thermal conductivity, which relates directly to the gradient, measures 1540 B.t.u. per square foot per degree Fahrenheit for 1 inch thickness. Whereas, steel has a measure of 360. Thus, a greater temperature differential, almost 4 to 1 will appear across the same thickness of aluminum as steel. However, when the columns for specific heat and specific gravity are multiplied together to take into account the inherent properties and densities relative to thermal capacities of these metals, it will be appreciated that the measure of time from a given heat source to establish the gradients per material are not so different. As for example, aluminum provides a measure of 0.623, whereas, steel a measure of 0.840, only about 150 percent thereof, which would be less than 1 and ½ times, the time dimension for a given wattage heat source, whereas the temperature drop or gradient dimension is of the order of 4 to 1. Thus, the secondary gradient can not only be achieved as to time, but it can also be perfected to the extent that secondary gradient characteristics are established just prior to the primary gradient characteristics, thereby avoiding overshoot and bringing the entire total system into stabilization at the set temperature point.

Thus, it may be appreciated that for a given amount of material, the factors to take into consideration are: Thinness commensurate with the strength necessitated by the particular work function to be achieved, as well as the minimum amount of material to be heated, thereby minimizing the gradient thereacross. As for example, consider the well-known pin heater, in which a cylindrical body of material is to be heated from the inside creating a surface temperature, in turn heating yarn of the synthetic variety for twisting, drawing, curing, and the like. To reduce the radiant and to minimize the time required to establish the gradient, the pin heater will be made as this as possible commensurate with the strength to withstand the pressures of the synthetic material being handled. Thus, it becomes necessary, in the leak path, to simulate the operations attendant thereto to establish an even faster path for the same gradient in order to achieve the no overshoot condition for preset temperature. With this type zeroing in of the parameters, it now becomes apparent how the control system can be a high resolution on-off inexpensive type control compatible to these parameters, capable of handling this system, and also susceptible to the digital computer logic analyzing. This permits the digital analyzing approach which is the epitome of high resolution accurate control in an otherwise analog system. From a practical standpoint, as long as the body of the thermal system can be made thin, obviously the gradient is low and the time response is small. Therefore from a condition of work load on, to work load off, there is no appreciable difference to introduce a reset to the control system.

This system offering distinct advantages where the thickness of the body can be minimized, still offers advantages where the thickness of the metal and corresponding temperature gradients are large relatively, and time factors are large relative to the thin wall system.

In FIG. 17 this embodiment of the invention is depicted as also being applied to the heating of synthetic yarn 214. It may be appreciated that the godet or body 211' to be heated is now made considerably thinner, thereby conserving costs and material and eliminating considerable thermal inertia. Adjacent to the body 211', there is a layer 220 of foil, such as aluminum foil, to serve for transferring heat. Also, it should be pointed out that in certain applications, such foil may serve as the heat radiator, for example, when the invention is employed in automobiles, the foil may comprise a portion of the decor or trim or may be deployed beneath the carpet or under the upholstery. In such event, the foil 220 would preferably be anodized or otherwise coated or painted black.

Next, the heater 221 is contained within suitable electrical and thermal insulation for the required purposes herein, examples of which will be described hereinafter. Preferably, a heat shield in the form of foil 222 is deployed on the other side of the heater 221 with the highly polished reflective side of the foil directed inwardly to minimize heat loss. The sensor 224 is disposed within the vicinity of heater 221 and is thermally insulated or controlled by the material or enclosure 225. This material may comprise, for example, selected electrical insulation with known thermal properties, silicon rubber insulation or combinations thereof or even heat shielding plates or enclosures, such as asbestos, mica, or the like.

In FIG. 18 it will be seen how the heater 221 is comprised of suitable heater wire 221', split into parallel paths 221''. The sensor 224 is then physically deployed within the parallel configuration, with its insulated enclosure of material 225 serving to control the heat flow to the sensor 224 in a manner related to the heat flow going to load 214 (FIG. 17).

One alternative deployment is shown in FIG. 19, wherein the heater wire 231 is also laid down in parallel configuration, but the sensor 232 is bifilar wound to cancel out induced signals or currents. This bifilar arrangement is, of course, critical where induction heating is employed, but has proven also of value with other heating arrangements. The control insulation is now shown as the heat shields 233 for control to simulate the path or heat flow to the load.

In FIG. 50 a suitable dimensioned heater-sensor arrangement is shown wherein, when applied to a pin heater for textile strands, it was found that the sensor reached set temperature 2° C. ahead of the work. The heat supplied was metered, and in 4 seconds the work and sensor had reached the same temperature which was established at set point with no overshoot. In FIG. 20 the work is shown as a section of the pin heater aluminum wall 240 having a thickness of 0.060 inches. Next close thermal coupling is obtained by using a layer 241 of silicon rubber insulating coating with adhesive of thickness of approximately 0.001 inches which is permanently bonded or vulcanized to the interior of the pin body wall 240. Next, there is basically employed a fiberglass layer 242 of thickness of 0.004 inches which is actually impregnated with the silicon rubber from layer 241 during heat treating or bonding at elevated temperatures. The next layer 243 includes the metal or current conductive foil heater and sensor, each of approximately 0.002 inches in thickness, embedded in the structure.

Next, a silicon rubber impregnated fiberglass layer of approximately 0.007 inches is shown at 244 with a 0.002 inches thick foil layer 245 completing the structure. Minimal heat loss is indicated at 246 with maximum heat transfer shown at 247, obtained because of the close thermal coupling of the heating element to the heater body and because of the lowered emissivity for loss heat 246 due to the polished foil layer 245 and supporting structure.

In the array of FIG. 20, the sensor is preferably of a nickel alloy, but can also be of e.g. copper and perform perfectly satisfactorily, as a substitute for platinum at considerable cost savings. Also, in such an arrangement current through the heater can produce the heat for curing the silicon rubber to produce the bonding of the sensor heater together and in intimate contact with the heater body.

FIGS. 22 and 23 illustrate one reason why the sensor-heater of this invention may be used with less material (and even usually less expensive material) required for maintaining the heat path to the work. In FIG. 22, a conventional heated drum or cylinder 250 is shown with a hole 251 being provided to receive the sensor, such as a thermistor. In FIG. 23 the dotted line 252 indicates how the material 250 can be reduced or removed when the heater-sensor of this invention is employed with at least the heater affixed along the inner surface 253. Alternatively, of course, in certain applications the heater and/or sensor can be employed externally of the body 250 as will be shown. In any event, it is seen that a definite finite thickness must be provided to accommodate a conventional point sensor within the body to sense temperature; whereas, the present invention relieves this problem and attendant material.

In FIGS. 24 and 25, there is shown a schematic illustration of the invention applied in combination with a conventional sensor to produce logical relations susceptible to computer handling. A heat conductor 260 provides the primary heat path to the work or load 261 and it is heavily insulated on all sides, as shown at 262, the heating element 263, preferably being in contact with conductor 260 and outwardly insulated at 264. The heat leak path is shown at 265 with the sensor 266 of the present invention.

In FIG. 24, the leakage path 265 may comprise as little as, e.g. one 0.01 or one 0.001 of the heat passed along the primary path, and, of course, heat leak path 265 may be intentionally constructed or at least intentionally located in a heat dissipating region.

By locating a conventional sensor 270 at the junction of heat leak path 265 and the primary path some interesting observations may be drawn from the relationship of temperatures at the various locations. The temperature of the heater is shown at the point 271 with the temperature of the conventional sensor 270 located at the common point of the primary heat path and the secondary heat path, the primary temperature path (FIG. 25) following a drop to the work temperature, shown at 273, and the secondary following a different or simulated path to the secondary sensor temperature at point 274. Now, knowing the temperature at the common point 272, differentials may be taken along the primary and secondary paths to provide information as to rate. Additionally, of course, it is now possible to apply further control, principally to the secondary sensor 266, as by preheating the same by radiant heat or with a tiny electrical current, or by colling the same with cool air, or otherwise controlling, as by materials, the relative time responsive for the temperature from point 272 to points 273 and 274. Thus, a considerable amount of information may be derived and high delicate control obtained with emphasis on eliminating overshoot, or alternatively, intentionally building in certain controlled amounts of overshoot where heat momentum or slow response is desirable.

In a different application of the invention, reference is had to the heavy wall extruder 200 (FIG. 26) wherein the wall of the extruder barrel has to withstand heavy pressures, but is limited in the thickness of metal and limited to the type of metal that can be used and, therefore, must live with—so to speak—gradients that are excessive to a good thermal system and time responses that are much longer than would be desired. However, the present invention can still simulate the temperature of the inner wall of the body, and even the average temperature of the medium within the body of the heater which is viewed as a cylindrical barrel. It would be an obvious advantage now to combine the data that could be derived from the new concept with the data that could be derived from the conventional concept. However, a third principle is now available wherein the melt 203 of the extruder may serve as a heat source for the impeller 201, propelling the melt along the barrel of the extruder to provide additional information for the computer.

In the conventional method, the primary gradient is through the thickness of the barrel of the extruder and almost suggests that a third measurement of temperature (rotating) be taken. For instance in a heavy walled or bodied thermal system, it is suggested that although there can be established a thermal gradient typical of the primary gradient, the time response due to the thickness of the metal could cause great time lag and errors in general at the computer. Therefore, it is proposed that a conventional sensor, located within the primary path and in the body of the extruder, as well as a rotating sensor that would be embedded in the rotating impeller be employed. The method of deriving the signal information and converting same to a frequency for rotating machines is disclosed in a U.S. Pat. application No. 698,784, dated Jan. 18, 1968 to B. B. Childress and assigned to the same assignee as this application, bearing the title, "APPARATUS AND METHOD FOR DEVELOPING TEMPERATURE INDICATIVE SIGNALS FROM STATIONARY OR ROTATING HEATERS OR DRUMS AND FURTHER FOR DEVELOPING CONTROL SIGNALS FROM THE TEMPERATURE."

The computer now has three signals, plus their time relationship for deriving data and developing command signals to a controller which would regulate the current flowing through the heating element using the previously described space sensor device for sensing temperature in the heat leak path.

In FIGS. 26, 27, and 28 there is illustrated a structure and temperature gradient flow diagram for enabling computer logic to determine several factors concerning the auger, melt temperature, barrel capacity, flow rate, impingements or blockages, ruptures and the like, merely from a knowledge of the temperatures and their interrelation in the two gradients, i.e., primary gradient and heat flow simulator or secondary intentional heat leak gradient, herein developed for the purpose of enabling computer techniques to analyze and handle, i.e., cope with all problems, monitor and control, the heretofore rather difficult inaccessible operation and information derivable from basically the interior of a high-speed expensive, heavy wall thermal extruder system.

In FIG. 26 the heavy wall barrel 200 is used for the extruder mechanism above described, but now analyzed in detail. The extruder barrel 200 contains the screw or impeller driver 201, adapted to propel the melt, indicated at 203, toward its exodus end. A shaft 205 supports the screw or impeller 201. It is interesting to note that while the primary source of heat to the melt is the external heating coils 207, nevertheless once the impeller 201 is caused to rotate or drive the melt, via shaft 205, there is experienced another factor in the form of sheer or frictional heat, generated from the contact and propulsion of the melt 203 by the screw or impeller 201. It is for this reason that several sensors may be employed to determine heretofore undeterminable quantities or information concerning such an arrangement. For example, the space sensor 211 may be carried on a ridge, such as 214, raised beyond the extruder barrel 200, for the simple reason that barrel 200 is already of heavy thickness and it is convenient to provide the heat loss or leak path out of the same material and simply more of the same. Thus, in FIG. 26, for considering the control of FIG. 28, there are preferably located, first a conventional sensor 221, embedded in the thick or heavy barrel wall 200, a rotating impeller sensor 225, carried by the screw or one of the blades of impeller 201 with its output available via shaft 205 to the extreme or other end of the extruding device, and an apparent or simulated temperature of the melt nonexistent sensor, simulated within the melt at position 227, which is in reality the space sensor 211, predicting the temperature at point 227, as is apparent from FIG. 28.

Thus, in FIG. 28 the right-hand portion of this graph relates to the various temperatures and gradient for the primary gradient necessitated by the heat load, whereas the left-hand portion is the simulated or artificially produced secondary gradient heretofore identified as the heat leak gradient. Thus, the common temperature is $T_H$, the temperature of the heater at the outside surface of the barrel. Obviously, heat flows from the external surface of the barrel, i.e., the source of heat, outwardly along the ridge 214 to the space sensor 211 and inwardly through the barrel 200 to the melt 203 and impeller 201.

Tracing this diagram from FIG. 28, it will be seen the normal or work gradient extends from the highest heater source temperature $T_H$ to the conventional sensor 221 temperature, initially encountered as the heat progresses inwardly. Next, the temperature $T$ inside is encountered and while not necessarily measured in this embodiment, a sensor could be placed at the inside of barrel 200; but, however, because of the extruder nature and the spiral or circulatory movement of impeller or driving mechanism 201, this sensor has been eliminated and thus, also all attendant problems involved with fracture, damage, and inaccessability. However, this temperature must be along the gradient and could be calculated from the information herein available.

Next, proceeding to the right in FIG. 28, along the normal load gradient, the average melt temperature is encountered, as depicted at point 227 in FIG. 26. It is this temperature which has been simulated for normal operating conditions by the heat flow simulator and the secondary temperature gradient to the left of the centerline of FIG. 28, as indicated at the temperature secondary flow sensor or space sensor 211.

Continuing on with the gradient normally supplying the work load to the right of FIG. 28, it will be noted that the least temperature encountered is that of the screw or rotating sensor, as shown at 225 in FIG. 26 which must derive its heat from the primary source, i.e., the heater winding 207, plus the heat generated by the friction and sheering forces of impeller 201, operative on melt 203. Thus, due to the fact that rotating energy is imparted to impeller 201, driving melt 203, any type of frictional or sheering energy develops additional heat, including movement of the melt 203 relative to the internal surface of barrel 200. This, of course, is additional to that generated within the melt itself, whether it be from these forces or from the external heater, which is the primary heating source 207.

Returning to FIG. 28, it will be noted when the heat flow simulator to the left of the centerline is viewed, that the first temperature drop is attributable to the gradient across the ridge 214; thus, showing temperature of the ridge at the first spot. Thereafter, the heat flow simulator temperature gradient is interposed between the temperature of the ridge and the temperature of the secondary flow sensor. This region is shown by the control insert 225, which may be inserted encapsulated, bonded, or otherwise employed to balance any given situation against the desired characteristics for computer logical control. This may be likened to a vernier trim in engineering terminology, such as the wafer layer shim or other thermal regulating laminate or control device 225, which may be made available in various sizes and shapes to match the characteristics, as specified herein for logic control.

Now, to examine the logic control available from the extruder thermal arrangement outlined in FIGS. 26 and 27 and graphed in FIG. 28, it may be appreciated that the logic or computer may encounter any one or more of the several following exemplary situations and provide an analysis which follows. Number one, assume that the extruder is out of melt. Then the first detectable parameter would come from the screw sensor 225 because the primary heat supply source would be broken and the sheer or frictional heat supply source would be nonexistent. Therefore, the temperature at 225 would drop.

Otherwise, other parameters would be changing if the temperature of screw sensor 225 dropped, but not so when the situation is caused by an absence of melt. Thus, an AND situation is created for logical analysis by such a circuit or computer. The other criterion would be that if truly there is no melt, all other temperature sensors would increase. Otherwise, this condition is not true and it would not signify an out-of-melt condition as will be brought forth in the following further logical situations.

In the second exemplary situation, let it be assumed that the extruder output becomes clogged. Then, the first fact is that the screw sensor temperature at 225 would rise rapidly. As an AND situation, but incorporating the time parameter, the other temperatures would all go up. Therefore, the computer now recognizes a differential or slope of the curve situation and can provide the information required to analyze and/or detect this problem.

By way of example, situation three may be such that the extruder ruptures, in which event, the screw sensor pressure at 225 goes down immediately and after a time delay, the other pressures go down. Obviously, such a situation can be detected and analyzed by a computer or a logical arrangement.

Now, with the many known parameters, and with the heat flow simulator prepared for normal conditions, it is apparent that numerous other situations could be presented in which the computer could analyze and arrive at the proper conclusion for control and/or handling or direction or alarm signalling of the particular situation encountered. It is for this reason that automatic factory control involving many or innumerable temperature systems.

It is important to note that the heat flow simulator or heat leak path provides certain heretofore unknown information useful in the logical determinations, as for example, it is always important to know what the average temperature of the melt or any other point should be during normal operating conditions and this is apropos whether or not such point is accessible or inaccessible.

In FIG. 29 there is shown a schematic arrangement for employing a digital computer 300 along with a scanner 301 to monitor a great number of thermal systems, illustrated as systems 1 to N.

The systems are preferably identical or similar and the computer 300 may provide the master frequency or other type control common to all systems.

In system number 1, the sensor 302 is provided in a heat dissipating path from the load (not shown) to enable a temperature-to-resistance change which is converted in the resistance-to-frequency converter 303 and the corresponding digital output frequency pulse train is transmitted over lead 304 to scanner 301. At the appropriate time, in a time sharing plan, the scanner 301 connects the frequency pulse train from system 1, over common input lead 305 to the digital computer 300 for comparison with the reference frequency developed therein and for logical determination of the requirement for and number of energy bursts to bring the load back to set temperature. The logical determination signal is sent over lead 306 to scanner 301, and at the selected time, applied over lead 307 to control the power amplifier 309 for introducing energy bursts to heater 310.

It will be appreciated that if, for example, the reference frequency is set at 3,000 Hertz and the minimum energy burst is equivalent to power being applied to heater 310 for one-tenth of a second, then the temperature is being measured 75 times during the minimum predetermined energy burst by frequency comparison. This is true because the master oscillator frequency of 3,000 Hertz divided by 4 is 750 pulses per second and one-tenth of a second accounts for 75 pulses. However, since the digital computer 300 is now being employed along with scanner 301, the frequencies may be raised and the master oscillator frequency may become, for example, 30,000 Hertz, which would likely permit the control of 500 thermal systems rather than perhaps 50. In any event, the principle heretofore explained obtains to permit the computer 300 to control a great number of thermal systems. In this respect the computer may be programmed to alarm upon fault or it may automatically connect standby circuitry for more reliable operation. This description is also applicable to the other systems 2 through N.

One or more of the N thermal systems of FIG. 29 may comprise even more complex arrangements with many monitored temperatures, such as the further extruder arrangement of FIGS. 30, 31, and 32. One concept presented is to heat the surface adjacent to the work, whether that surface be flat or curved or in the case of the extruder, the inner cylindrical surface of the heavy wall body. A cavity 401 (FIG. 33) is machined in the inner wall 403 to accept the foil heating element 405 and thermal or electrical insulation 407 as detailed earlier herein. The heating element 405, with this insulation, is placed in this cavity and then a relatively thin metal 409, which may be the same material as the main heater body, is placed over the heater 405. Since this thin surface (409) is to be in contact with the work, it should be a good conductor of heat. It is necessary, or at least desirable, to hermetically seal the cavity holding the heater foil 409, and one way to accomplish this is to glaze the entire inside surface with a material such as aluminum or titanium oxide. This coating is of the order of 2 to 3,000th of an inch thick and provides a bonding strength of approximately 10,000 pounds per square inch. This is a known art, being practiced by Union Carbide Chemical Company presently.

Now, with the hermetically sealed cavity containing the heating element, it is desirable to have a pressure control system beneath the heating element so that any pressures crated against the heated wall by the work or any pressures created by differences in thermal expansion may be balanced with the pressure control cavity. This cavity is filled with a compressible liquid or gas, which is preferably inert to insure long heating element and insulation life. Conventional pressure control means may be employed to maintain the cavity pressure at a predetermined value or at a value equal to the pressure exerted by the work. FIG. 33 depicts such a system at 410 as the pressure control, via connecting tube 411 to the rear chamber 412.

Referring to FIGS. 26 and 27, it is noted that the conventional method of heating such a heavy wall extruder is inefficient, inaccurate, and extremely slow in response. By adding the sensor 225 to measure the temperature of the rotating screen and a second rotating sensor 226 to measure the temperature gradient along the number 2 heat leak path, there is developed valuable information when used in conjunction with the conventional sensor 221 and the heat leak sensor 211. However, the application of the principle of heating the inside wall of the vessel produces a much more efficient system. In this case, the action of the heavy wall thermal inertia extruder barrel is reversed. This heavy wall now becomes the heat leak path, instead of the primary heat flow path.

It should now be appreciated that if the heater is directly effective on the inside wall of the extruder, according to the detail of FIG. 33, the heavy insulation is placed around the outside body of the extruder, as shown at 428 in FIGS. 30 and 31.

It is to be noted that when the heater or heating element is placed on the inside wall of the extruder, the second heat leak path is the heat flow that travelled through the screw blade and through the screw shaft and back into the atmosphere, as indicated in FIG. 32.

A rotating oscillator and sensor 425, and a second rotating heat leak sensor 426 may be incorporated to establish a gradient along the heat leak path, as described; it extends through the screw blades 404 and through the screw shaft 405. Further, heavy insulation 406 is placed around the shaft 405 and bearings 407 to prevent heat loss along this second heat loss path. In other words, referring to FIG. 30, there is one heat source 408, heating the heavy wall body 400 and through the screw blades 404 and shaft 405 as described above, and through its insulation system 406 to the atmosphere.

Next, a further concept involves heating the shaft 405 and screw blades 404, through slip ring means 410 and 411, and rotating heaters 412 embedded in the shaft 405 and the screw 404 in the same fashion as those embedded in the body of the extruder at 408. These heaters may spiral around the shaft and be situated in between the screw blades and may spiral around the augerlike blades of the screw, being connected to a suitable power source through the slip rings.

Referring now to FIG. 30 and the temperature profile of FIG. 32, the approach to this invention may commence at any given point, since the temperature profiles have at least a common ambient temperature point. Beginning with the temperature of the inside wall of the body of the heater, then proceeding clockwise (FIG. 33) to consider the heat flow through the melt to the point 427 (which is the average temperature of the melt assuming the average temperature of the melt to be lower than the inside wall). The heat received from the inside wall will be considered. Now, proceeding from T-427, the calculated temperature and approaching the blades 404 and/or shaft 405 of the heater, let it be assumed that the temperature of the blades and the shaft be relatively the same, and equivalent to the temperature of the inner wall. Now, it is realized that the melt is receiving its heat energy from two sources—one from the inside wall and one from the blade and shaft. So, two primary heat flow systems are established, and it is to be seen that two heat leak paths are available. At a point showing the temperature of the blades and the shaft (T-blades and shaft) and proceeding clockwise down the gradient, it is to be observed that the second heat leak sensor would be T-425 and is more than the temperature T-426 because heat is flowing in this heat leak path along the shaft 405 and through the insulation into the atmosphere. Proceeding further clockwise from T-426, there is encountered a temperature representing the outside temperature of the rotating insulation.

Then, continuing clockwise, there is perceived a common temperature with the first or other heat leak path where the rotating insulation is exposed to the ambient temperature. Considering the original temperature, that of the inside wall temperature, and looking counterclockwise, there is first considered the heating element insulation temperature and next the temperature marked T-outside wall heating element.

Then continuing counterclockwise, there is encountered a temperature T-421, representing the stationary heat leak sensor and a temperature, T-outside wall. Continuing counterclockwise, there is a temperature T-outside insulation stationary, and then on to the common temperature, i.e., the ambient. Thus, it is apparent that the two heat loss paths have a common temperature—that of the ambient.

This system is highly efficient, highly accurate, and extremely fast in response. It is to be observed that an ideal situation exists where T-421, T-427 (calculated), and T-425 of the rotating heat leak sensor would be the same for normal operating conditions. Control of the heat into the shaft and blades with the rotating heat leak sensor, T-425, and control of the heat to the inside wall heating element using the sensor T-441 is now available.

It is to be seen here that the heat is very quickly and efficiently delivered to the melt and that many gradients are established and measured along either or both of the heat leak paths, and valuable information is obtained from the computer or logic analysis.

Considering now the rotating thermal system and what could be determined by measuring the difference between the temperatures measured in the rotating systems, that is temperature T-425 of the blade and temperature T-426 along the shaft or along a heat leak path where the thermal energy is controlled as indicated earlier, heretofore unobtainable information is delivered.

Under normal conditions this temperature gradient could be calculated and measured by converting the difference of the two temperatures to a frequency and transmitting it to the computer or control area. There is readily established high and low limits which sound an alarm, provided this gradient indicated too little heat flow or too much heat flow. The computer or control logic may alarm and/or signal the control to change the level of energy being metered to the rotating thermal system as required.

To summarize this approach, consider that heretofore it has been common practice to look at the thermal system as being divided into two parts——that part of the energy which is useful or converted into work and that part of the energy that is aimlessly dissipated or wasted. And although man has concentrated on higher and higher efficiency thermal systems, he has been more concerned with the flow in the primary path and has neglected to obtain valuable information that could be determined along a heat loss or heat waste path. Herein it is controlled heat leak paths that are established or located with known parameters.

The remote frequency sensitive control system has now been shown to be compatible with computer technology, particularly where use can be made of a computer and a high-speed scanner to inspect many thermal systems and in turn develop control command and/or alarm signals.

In FIGS. 34 and 35, there is shown a thermal system which is particularly applicable to heated godets, plates, pins, or cylinders and also encompasses drying rolls or cylinders useable for textiles, paper, plastics, or the like. Most of the principles described are equally applicable to commercial or household appliances, such as controlled frying pans, irons, rollers, and the like.

In FIG. 34 a cylinder 400 of steel or other relatively inexpensive material (even including wood, styrofoam, or other low thermal capacity mass) is provided with, for example, a spiral groove 401 (FIG. 35) in which there is located preferably an insulated nickel sensor wire 40. A heat shrinkable sleeve 403, such as of Teflon, is then placed over cylinder 400 and shrunk to grip the cylinder tightly, thereby affording both heat and electrical insulation.

Then, a foil heater 404, of aluminum or other suitable selected material, is deposited or wrapped around the Teflon 403. A further heat shrinkable sleeve, such as a Teflon layer 405 may then complete the structure to provide a heated surface for a load, such as the plastic strands 406. It may be seen readily how the thermal control may be satisfied by varying the thickness of, e.g., Teflon layer 403 to control the thermal coefficients to sensor wire 402.

Alternatively, the outer layer of Teflon 405 may be covered with or replaced by a metal, glass, or ceramic coating or layer, depending upon the particular work to be heated.

For the appliances employing the particular configuration of FIGS. 24 and 35, it should be mentioned that the sensor oscillator, heretofore described, may be contained in the cord and such appliances coordinated into the automatic multiple thermal system of FIG. 29. Alternatively, for an inexpensive single domestic appliance, the sensor could provide a temperature signal to a conventional analog control.

In applying the apparatus of FIGS. 34 and 35 to certain applications in high-speed fields, such as textiles, it may become necessary to drive off the solvents from materials, such as fiberglass strands coated with plastic, and then to fuse these materials. It should be pointed out that the roll of the structure of FIG. 34 may be employed to drive off the solvents with the fusing accomplished by radiant heat, also susceptible to the close control afforded by this invention.

For this purpose a sensing resistor wire 410 is shown disposed in spaced position with the construction of FIG. 34, in order that radiant heat may be sensed in lieu of, or in addition to, the conducted heat influencing sensor wire 402, by controlling the proximity of sensing wire 410 to the periphery of the Teflon layer 405, thus the control sought may be obtained. However, in this arrangement it may be necessary to preheat, as by trickle current through, or warm air blasts on, resistance 410. Therefore, it may be appreciated that the invention is applicable to arrangements embodying heat conduction, radiant heat, or convection heating, so long as the common point between the main path and the measured path exists.

Alternatively, and referring to FIG. 34, a conduction-type heater is shown in a cylindrical form at 400, being the body of the cylinder heater. The heat flow is from the heat source 404 which now is affixed or bonded to the outside of the cylindrical body 400. The work in this instance will pass around the cylindrical body or essentially therearound, in such a fashion that the heat energy from the heat source 404 will be transmitted with as small a temperature gradient as possible to the work 406, which could also be a web or sheet of material.

It is understood that the temperature of the work surface will be such that it is adequate, as long as the material or work velocity is above a certain level. If the work velocity should fall below this level, the rate of transfer of heat would be too great, per unit length of work material, thereby resulting in damaging effects to the work. Upon proper selection of body heat source and electrical insulation 405, a low thermal capacity heater may be designed such that when signalled to turn off the stored thermal energy of parts 400, 403, 404, and 405 would not be sufficient to cause damaging effects to the work 406 if the velocity fell below the damaging level including a rest condition. An example of this would be a rotating heater which was supplying heat to a fabric, such as a cotton material, where it is known that if heated to a certain temperature, the cotton fabric will scorch. If a conventional, relatively high thermal capacity metal drying cylinder were employed, and operating at a temperature at or in excess of that possible to scorch the material if it were stopped, the stored energy of this conventional drum type drier would probably have enough stored energy to scorch the material upon work stoppage even if the heating source were turned off at the instant the work was stopped.

Use of the new low thermal capacity heater on the outside of a low thermal capacity body—which could be wood, styrofoam, or other similar low thermal capacity material—avoids scorch. Another example of a low thermal capacity body, is a laminated paper board tube which has relatively good structural or mechanical strength, very low thermal capacity, very high electrical insulating properties; and, if the heating element is below a temperature damaging to the paper board, the heating element could be affixed to the body without electrical insulation.

In summary, the present invention is explained in connection with various embodiments thereof to emphasize logic control in a thermal system. While the particular electrical control has been referred to as of the on-off variety, it will be appreciated that this on-off variety is nonconventional and unique because it may be regarded as a definite commitment type control wherein, when a given condition is true, then a definite amount of energy is committed. This, of course, is regardless of the magnitude of the error at the moment, where only polarity need by known or established. On the other hand, it is possible to calculate the number of predetermined energy bursts required to accomplish a specific function, i.e., to raise the temperature of a load from ambient to set point, and/or to calculate for a known temperature level change, or for a known load change.

Also, in summary concerning the electrical logic, it is apparent that if the frequency of the reference is divided by 2, or a multiple of 2 that exact or proper logic would be represented by having a number of pulses equal to one-half the divisor occur during the negative half-cycle of the divided reference.

If the reference is divided by an uneven number, proper logic could be derived at a point equal to one-half the divisor ± one-half pulse occuring during the negative one-half-cycle. Therefore, when one of the sensed or reference frequencies differ from a fraction or multiple of the other, then control derived by logic dictates whether or not the predetermined burst(s) of energy is or are necessary.

We claim:

1. An electronic logic control apparatus for providing a timed output signal when one frequency signal is different in a predetermined direction from a fixed frequency signal comprising, means for developing the fixed frequency signal as a square wave train at a fraction of the original fixed frequency; AND gate means connected to receive as one input thereof the square wave train; means for developing said one frequency signal variable in frequency in proportion to an energy level means for determining if a selected number of pulses of said one frequency signal occur during a selected portion of the square wave train to produce one condition at the AND gate means by applying a pulse as another input to the AND gate means; and means responsive to the AND gate means during said condition to produce said timed output signal metered over a predetermined time interval.

2. The control apparatus of claim 1 wherein the means for developing the fixed frequency signal comprise oscillator means for developing the fixed frequency signal; and means for dividing the frequency and converting the signal to a square wave train 3. The control apparatus of claim 1 wherein the means for determining if a selected number of pulses of said one frequency occur during a selected portion of the square wave train comprises counting and gating means operable by said one frequency signal and the square wave train.

4. The control apparatus of claim 3 wherein the counting and gating means applies output pulse to the AND gate means upon detection of said condition; the other signal to said AND gate means comprising the square wave train.

5. The control apparatus of claim 1 wherein the means responsive to the AND gate means comprises multivibrator means triggered by the AND gate means upon detection of said condition.

6. The control apparatus of claim 1 further comprising alarm means operable from the means for determining if a selected number of pulses in response to a frequency deviation of a predetermined amount between said one frequency and the fixed frequency.

7 The control apparatus of claim 1 further comprising means for developing said one frequency signal be sensing said energy level directly.

8. The control apparatus of claim 1 further comprising means for developing said one frequency signal by sensing said energy level indirectly.

9. The control apparatus of claim 1 further comprising means responsive to variations of said energy level to produce an analog signal indicative thereof, and means for converting the analog signal to a digital frequency pulse train to comprise said one frequency signal.

10. The control apparatus of claim 1 further comprising heating means for at least one thermal load; and heat sensing means for developing said one frequency signal in accordance with the heat energy level sensed.

11. The control apparatus of claim 10 further comprising means for supplying energy to the heating means in response to said timed output signal.

12. The control apparatus of claim 10 further comprising means for supplying energy to the heating means; control means for said means for supplying responsive to said timed output signal to cause the means for supplying to supply metered energy bursts to the heating means corresponding in time to the period of each timed output signal.

13. The control apparatus of claim 1 for controlling a thermal system further comprising a primary heat flow path from a heat source to a load; a secondary heat flow path extending from the primary heat flow path; sensing means responsive to said energy level of heat in the secondary path at a given position to develop said one frequency signal; heat flow control means in the secondary heat flow path between the primary heat flow path and the given position to simulate load conditions at the sensing means; and means for adjusting the magnitude of heat flow along the primary path in response to said timed output signal.

14. A electronic logic control apparatus for providing a metered output when one frequency is different from another frequency comprising, means for developing a fixed frequency; means for converting the fixed frequency to a square wave train at a fraction of the original fixed frequency; AND gate means connected to receive as one input thereof the square wave train and as the otherinput thereof a conditional signal in accordance with the other frequency; means for determining if a selected number of the other frequency pulses occur during a selected portion of the square wave to produce said conditional signal at the AND circuit to cause an output therefrom; and means responsive to said output therefrom at the AND circuit for metering for a predetermined time interval.

15. Logical thermal control apparatus comprising in combination means for supplying heat to a load; control means for the heat supply means; temperature sensing means disposed relative to the load to simulate the temperature thereof; means for converting the sensed temperature to a digital frequency pulse train; logic means; means for supplying the digital frequency pulse train to the logic means; means for supplying a fixed frequency to the logic means for a determination of whether the load temperature is below, equal to, or above a predetermined temperature and producing a signal when the load temperature is below the predetermined temperature; and means for energizing the control means for a predetermined amount of energy to be supplied to the heating means in response to said signal.

16. The control apparatus of claim 15 wherein the temperature sensing means comprise thermal control means disposed to receive a portion of the supplied heat and having thermal coefficeints to modify the flow of said portion to simulate load conditions.

17. A multiload temperature control system comprising a plurality of heating means respectively associated with the loads for bringing load temperatures to predetermined set point temperatures through on-off power bursts; a plurality of temperature sensors respectively disposed in heat dissipating paths of the loads; resistance to frequency converters respectively in electrical connection with each of the temperature sensors and physically deployed in proximity thereto to develop frequency pulse trains indicative of the temperatures being sensed; means for developing a reference frequency and for logically comparing the frequency pulse trains and the reference frequency to produce control signals for the load heating means associated with the loads at temperatures less than set point; and means sequentially introducing said frequency pulse trains to the means for developing and comparing and for sequentially applying said control signals to the heating means.

18. The control system of claim 17 wherein the load heating means meter input power in predetermined energy bursts to heat the load in response to said control signals, and said control signals being of relatively short time duration relative to the time interval of a predetermined energy burst whereby the multiload temperature control is effected from a single means for developing and comparing.

19. Apparatus for providing timed output signals when the frequency of a first signal changes in a predetermined direction and amount as determined relative to a fixed frequency periodic timing wave, comprising in combination means for developing said periodic timing wave; coincident detector means connected to receive as one input thereof said timing wave and as another input thereof a logical control signal; counting means responsive to the frequency of said first signal and the timing wave to develop said logical control signal when the frequency of said first signal varies said amount in the predetermined direction; and means responsive to the occurrence of said logical control signal to produce the timed output signal over a predetermined period of time.

20. Apparatus in accordance with claim 19 further comprising means responsive to variations of an energy level to produce an analog signal indicative thereof; and means for converting the analog signal to a digital frequency pulse train to comprise said first signal.

21. Apparatus in accordance with claim 20 further comprising heating means for a thermal load, means for supplying energy to the heating means; and control means for the means for supplying responsive to said timed output signal.

22. A method of maintaining a predetermined set temperature at an electrically heated load comprising the steps of: deriving an analog temperature signal in accordance with the instantaneous temperature of the load; converting said analog temperature signal to a digital pulse train having a frequency in accordance with the temperature; deriving a fixed frequency periodic timing wave; counting the occurrence of signal frequency manifestations relative to the time of occurrence of selected waves of the periodic timing wave; establishing an electrical heating path to the load whenever a predetermined count is realized; and introducing a discrete amount of heating current each time said predetermined count is sensed.

23. A method of controlling the temperature of a load using on-off heating control comprising the steps of: determining a minimum predetermined energy burst relative to the load which will change its temperature almost undetectably; sensing the temperature of the load relative to a predetermined temperature; applying a minimum predetermined energy burst to the load when the sensed temperature is below the predetermined set temperature; and sensing the load temperature one or more times during the time interval of the application of the minimum predetermined energy burst in order that a commitment of successive minimum predetermined energy bursts may be determined if required to permit the application of almost continuous energy to the load until set temperature is attained.

24. The method of controlling the temperatures of a plurality of loads in accordance with claim 23 by the further step of sequentially scanning the temperature signals from the plurality of loads respectively at a rate sufficiently high to scan all temperature signals at least one during the period of a minimum predetermined energy burst.

25. On-off type logical thermal control apparatus comprising in combination means for supplying heat to a load; control means for the heat supply means; temperature sensing means disposed relative to the lead to simulate the temperature thereof; means for converting the sensed temperature to a digital frequency pulse train; logic means; means for supplying a digital reference to the logic means for a determination of whether the load temperature is below, equal to, or above a predetermined temperature and producing a signal when the load temperature is below the predetermined temperature; said control means comprising means for metering energy into predetermined amounts measured over predetermined periods of time in which each predetermined amount is sufficient only to urge the load temperature upwardly; and means for energizing the control means for a predetermined amount of energy to be supplied to the heating means in response to said signal the temperature sensing and conversion being accomplished at a rate equal to at least once during the time of a predetermined time interval.

26. A method of supplying thermal energy to a load through application of heat in on-off fashion comprising the steps of: establishing a reference indicative of a set temperature for the load; instantaneously sensing temperature indicative of the load temperature; converting the sensed temperature to a temperature indicative signal; logically comparing the reference indicative of the set temperature with the sensed indicative temperature signal to determine if the load temperature is below set temperature; applying a predetermined amount of energy to the load metered over a predetermined time interval when the load temperature is below set temperature and which amount is sufficient only to elevate minutely the load temperature; continuing the instantaneous sensing and logical comparison to continue the application of predetermined amounts of energy until the load reaches set temperature; said instantaneous sensing being accomplished at a rate equal to at least once during each time interval corresponding to said predetermined time interval.

27. Apparatus for controlling the application of thermal energy to a load in on-off fashion comprising, in combination means establishing a reference indicative of set temperature for the load; means instantaneously sensing temperature indicative of the load temperature; means for converting the sensed temperature to a temperature indicative signal; means responsive to the reference indicative of set temperature and the temperature indicative signal for logically comparing them to determine if the load temperature is below set temperature; means for metering a predetermined amount of energy over a predetermined time interval which amount is sufficient only to elevate the load temperature minutely; and means for applying energy in predetermined amounts to the load as long as the load temperature is below set temperature; said instantaneous sensing being accomplished at a rate equal to a least once during each time interval corresponding to said predetermined time interval.